United States Patent [19]

Woods

[11] Patent Number: 5,795,154

[45] Date of Patent: Aug. 18, 1998

[54] ANAGLYPHIC DRAWING DEVICE

[76] Inventor: Gail Marjorie Woods, 617 Thomas St., Apt. 7, Three Rivers, Mich. 49093

[21] Appl. No.: 844,258

[22] Filed: Apr. 18, 1997

Related U.S. Application Data

[63] Continuation-in-part of Ser. No. 499,362, Jul. 7, 1995, abandoned.

[51] Int. Cl.[6] .................................................. G09B 11/00
[52] U.S. Cl. ................................................ 434/87; 434/91
[58] Field of Search ................................ 434/87, 88, 91, 434/92

[56] References Cited

U.S. PATENT DOCUMENTS

| | | | |
|---|---|---|---|
| 282,659 | 8/1883 | Newman. | |
| 1,541,480 | 6/1925 | Compton et al. | |
| 1,974,442 | 9/1934 | Baldwin | 33/174 |
| 2,293,696 | 8/1942 | Burchell | 41/34 |
| 2,560,658 | 7/1951 | Pareto | 88/24 |
| 2,571,613 | 10/1951 | Rissland | 434/91 |
| 2,587,585 | 3/1952 | Ayres | 45/129 |
| 2,720,722 | 10/1955 | Hiser | 45/131 |
| 3,364,598 | 1/1968 | Cook | 434/87 |
| 3,696,529 | 10/1972 | Mabbutt | 35/26 |
| 4,205,849 | 6/1980 | Perkins | 273/155 |
| 4,319,401 | 3/1982 | Jones | 434/87 |
| 4,620,770 | 11/1986 | Wexler | 350/132 |
| 4,836,783 | 6/1989 | Hrper | 434/87 |
| 4,931,017 | 6/1990 | Mann | 434/87 |
| 4,976,620 | 12/1990 | Tacquard et al. | 434/87 |
| 5,065,523 | 11/1991 | Chiang | 434/87 |
| 5,100,325 | 3/1992 | Cutler | 434/91 |

FOREIGN PATENT DOCUMENTS 384919  12/1932  United Kingdom ............... 434/87

OTHER PUBLICATIONS

Nicyper, R; *Constructing Anaglyphic Images on Phantogram Perspective Charts;* Graphicraft; POB 509, Westport, CN 06880; 1979; pp. 2–11.

Craig, J; "A new use for 3–D", *The Architect's Journal;* The Architectural Press; London; Jan. 21, 1954; pp. 76–84.

Girling, A.N.; *Stereoscopic Drawing;* Self Published, 13 Gleneagle Rd; Streatham, London SW16:6AY; 1990; pp. 14–28.

*Primary Examiner*—Paul J. Hirsch

[57] ABSTRACT

An educational and entertaining anaglyphic drawing device for producing complementary colored anaglyphic drawings on a copy sheet that will appear three dimensional when viewed through 3-D glasses having a first lens approximately red in color and a second lens approximately blue in color. The device comprises a stencil sheet with component stencil designs which when taken together form a composite stencil design of the first eye view and the second eye view of a stereogram. Associated with the stencil sheet is a register so the stencil designs can be successively aligned in register on the copy sheet and the designs transferred by penciling around the stencil design with drawing instruments. The first eye view of the stereogram is transferred in a green-blue color; and the second eye view is transferred in a red-orange color. A coordinated register allows different stereograms stencil designs to be combined so that different three dimensional objects appear to intersect with each other. The stencil sheets can be assembled as parts of a kit and as pages of a book. The device is simple and inexpensive to manufacture and is easy to use and attractive to children.

24 Claims, 18 Drawing Sheets

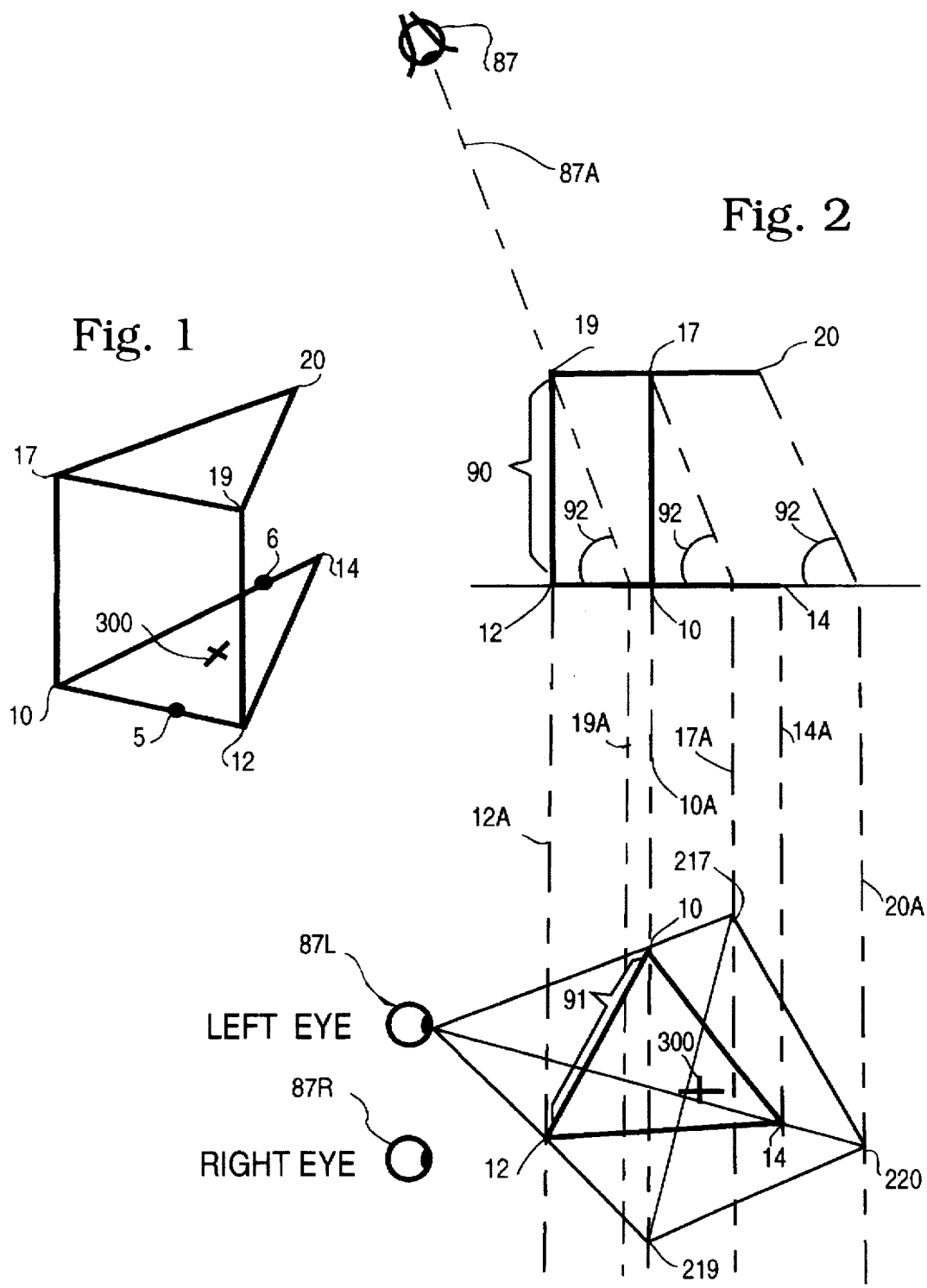

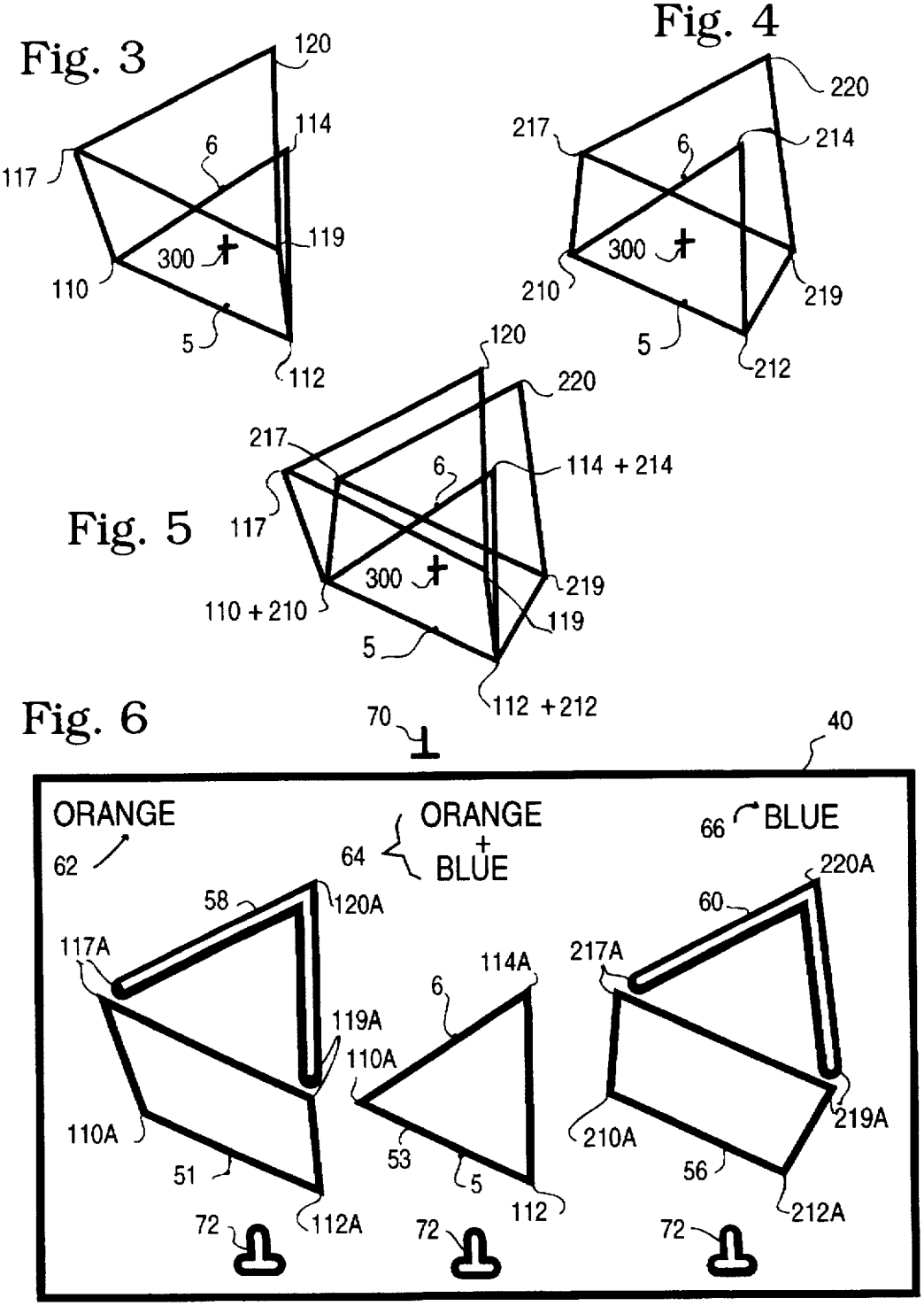

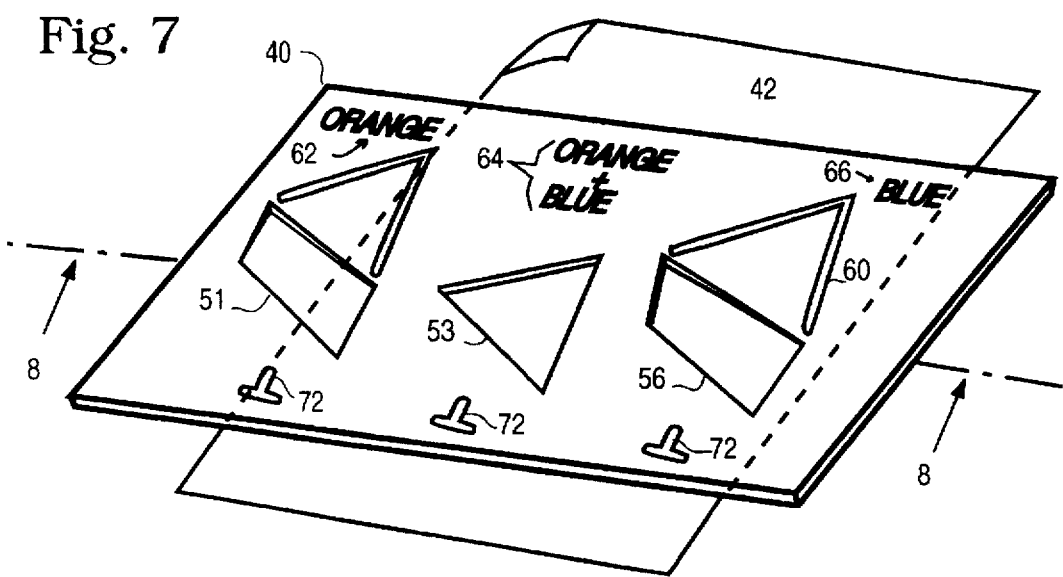
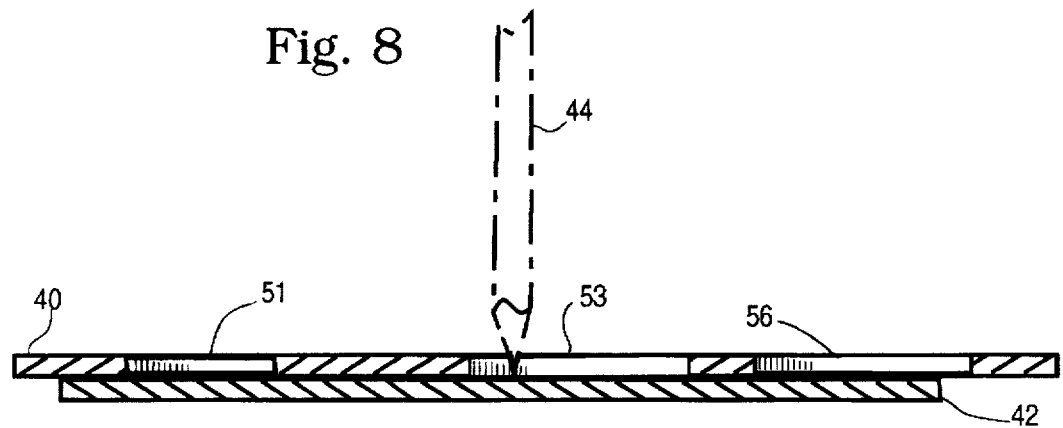

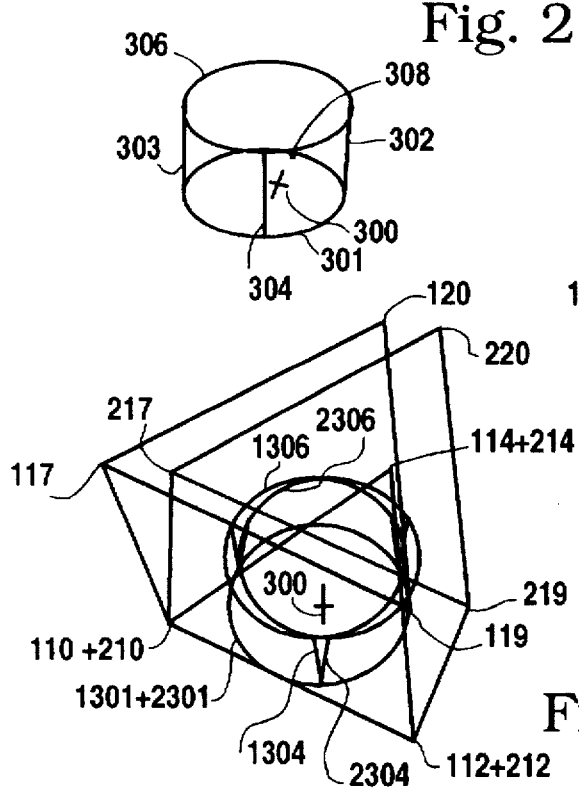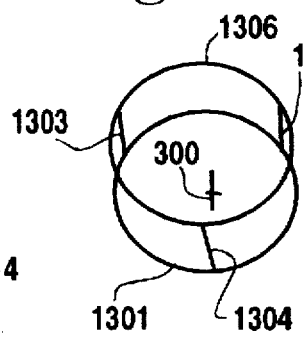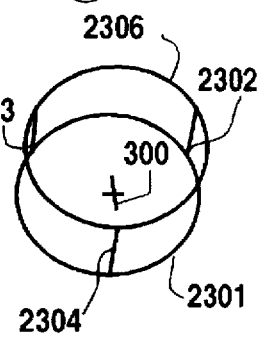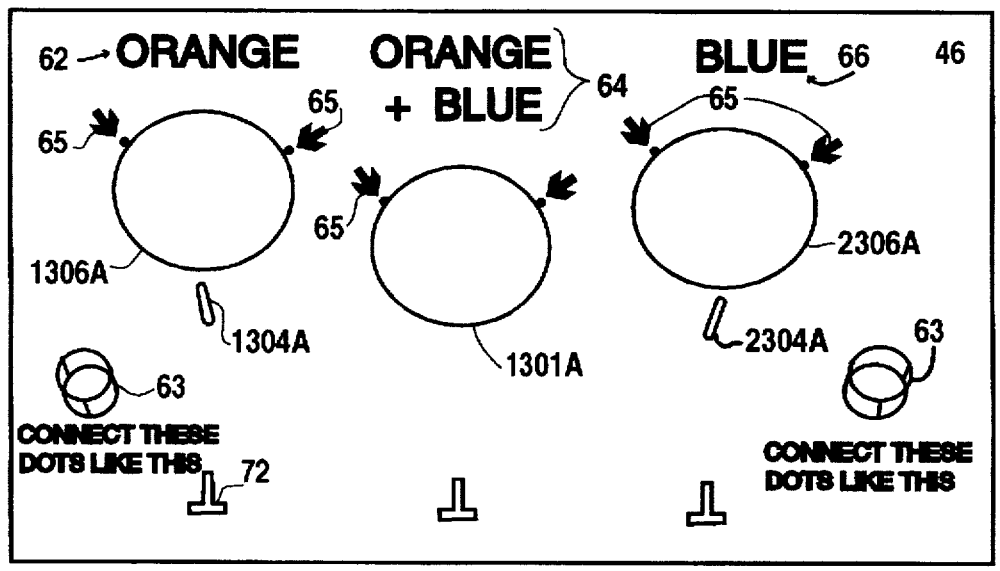

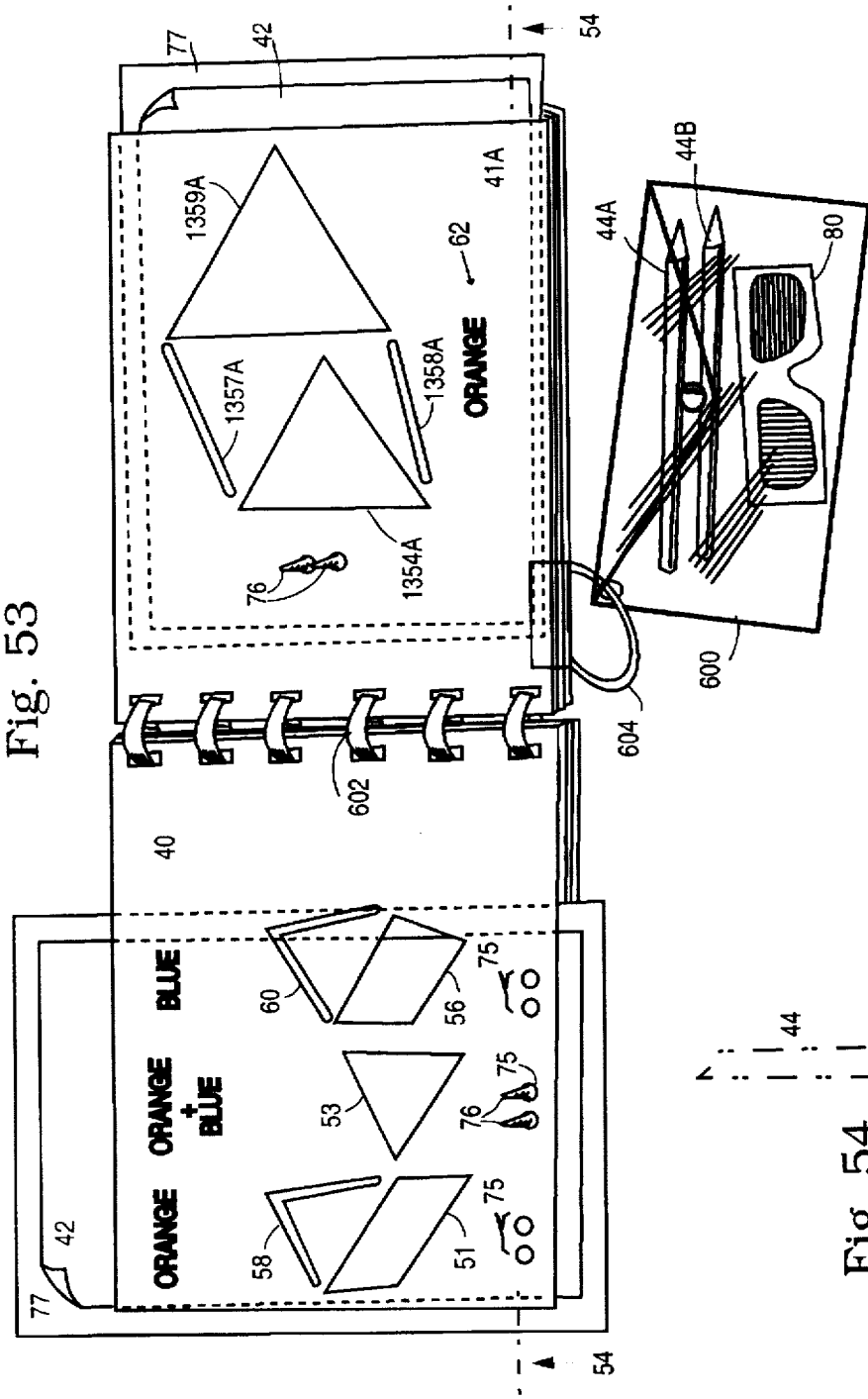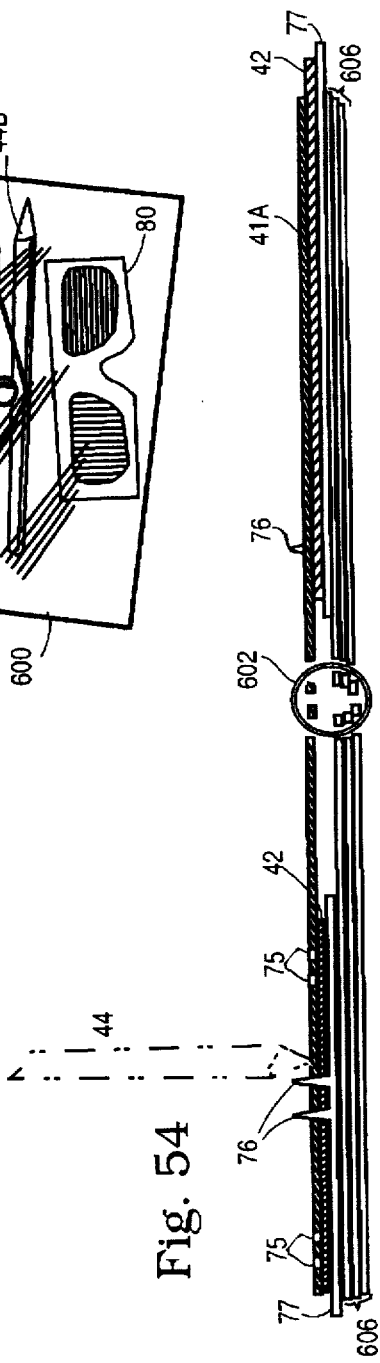

ANAGLYPHIC DRAWING DEVICE

This is a continuation-in-part of application Ser. No. 08/499,362 filed Jul. 7, 1995, now abandoned.

BACKGROUND

Anaglyphs are known in the art as useful for entertainment and technical illustration. Most people are familiar with 3-D comics and the like. Anaglyphs, sometimes called projective anaglyphs, are used for illustrations in descriptive geometry, architecture, crystallography and other technical fields. Anaglyphs are produced on a two-dimensional surface, but when properly viewed, they appear to be three-dimensional. Because anaglyphs are not restricted to being materially solid in three dimensions, they can create the illusion of three dimensional models that would be difficult if not impossible to make, e.g., objects suspended without support. The illusion defies logic as an object can appear to hover in space above the two-dimensional surface or to plunge through what the viewer knows to be a solid object. It is this dual nature that makes anaglyphs both entertaining and illuminating.

Anaglyphs are made from a pair of nearly identical pictures called a stereogram. Each picture is produced in a different complementary color. Each picture contains the same elements, but the elements may be shifted horizontally with regard to each other. The pair of complementary colored pictures are combined so that those elements are superimposed which are to be seen as in the plane upon which the pictures are produced. Elements which are to be seen as above and/or below this plane are displaced horizontally.

The anaglyph is viewed through glasses having complementary colored lenses, one for each eye. By viewing the anaglyph through these glasses (from now on called 3-D glasses) one complementary colored picture is washed out for each eye. This results in each eye seeing a different picture of the pair. Because some of the elements are shifted horizontally, those elements that cause the viewer's eyes to turn inward are perceived as being closer to the viewer and those elements that cause the viewer's eyes to turn outward are perceived as being distant.

In 3-D comic books and the like, the elements are usually abruptly shifted horizontally and the images appear to be floating planes. In projective anaglyphs there is usually a graduated shifting so the images appear to be continuous. The angle at which these anaglyphs are viewed may be different and is explained further below. Projective anaglyphs are made from stereograms which are obtained in several ways: photographically; mechanically (as with U.S. Pat. No. 2,587,585-Ayres, 1952 and U.S. Pat. No. 2,560, 658-Pareto, 1951); by computer programs; by using pairs of orthographic grids each approximately 6 to 16 degrees apart; and graphically which is explained below.

Anaglyphs are produced on a copy sheet through several methods such as two-color printing; computer drawing in two colors or by drawing with two colors. The first two methods require expensive equipment. The third requires a high level of skill in the graphic arts, as the drawings must be clean and accurate without noticeable guide lines or erasures, or the illusion of three-dimensions will not be perceived (this is known as stereopsis).

New anaglyphs may also be created that combine all or parts of different stereograms. For example, if an anaglyph of a large cube is combined with an anaglyph of a small cylinder, the result could be a cube with a cylinder suspended inside or three sides of a cube and a suspended circle. Again a high level of graphic arts skill is required.

The difficulty is that although combining the entertainment of anaglyphs with the educational benefits of manipulating interesting geometric shapes would be beneficial for children, the previously mentioned methods of making anaglyphs are too difficult for children, or are too costly to be easily available for them. Thus they are deprived of the tools to actively engage in creating anaglyphs of their own and must rely on being passive recipients of anaglyphs created by others.

Active involvement is an important part of the educational process. A process that is both edifying and entertaining involves more of the mind and enhances understanding and retention. Activities that combine graphic art techniques with scientific endeavors encourage an enriched understanding of both. For the foregoing reasons there is a need for a device for transferring stereograms to a copy sheet as anaglyph that is inexpensive to manufacture, inexpensive and simple to operate and which is attractive to children for the purpose of their entertainment and education.

SUMMARY

I have invented a device for producing on a copy sheet, anaglyphic drawings that will appear three dimensional when viewed through 3-D glasses having a first lens approximately red in color and a second lens approximately blue in color. The device comprises a stencil sheet and a register. The stencil sheet has stencil designs therein which when taken together form a first eye view and a second eye view of a stereogram. A stereogram is a pair of nearly identical pictures with elements shifted horizontally of each other. One picture is the first eye view and the second picture is the second eye view. When these pictures are viewed so that each eye sees only one view, the image will appear to have depth. The register aligns the copy sheet with the different stencil designs so that the stencil designs can all be successively transferred to the copy sheet to reform the pictures of the stereogram. The first eye view stencil designs are transferred with a green-blue color drawing instrument and the second eye view stencil designs are transferred with a red-orange color drawing instrument. With this device children will be able to use the familiar technique of transferring stencil designs to make their own 3-D drawings.

The stencil sheet can also have indica on it. Indica being things like written instructions, pictures, icons or colors to help the one using the stencil sheet. This is an advantage for children who may not possess appropriate reading skills but can understand pictures and colors.

One version of the register can be the combination of a registry guide within the stencil sheet and a registry mark on the copy sheet. In this way the registry mark on the copy sheet can be successively aligned with the registry guides of the stencil sheet and the stencil designs can be successively transferred to the copy sheet with the red-orange or green-blue drawing instruments. This is an advantage because the stencil sheet and register are all flat and easy to store.

Another version of the register can be the combination of a registry guide and a registry platform such that the copy sheet can be attached to the registry platform, the registry platform successively aligned with the registry guide, and then the stencil design transferred to the copy sheet. Another version of the registry platform can have a registry pin fixed upon it. This registry pin can be successively, mechanically attached to the registry guide and the stencil designs transferred to the copy sheet. The registry platform can also be a flat surface large enough to support the copy sheet as the stencil designs are transferred to it. The advantage of having the registry platform and copy sheet mechanically attached to the registry guide in the stencil sheet is to prevent movement while the stencil design is being transferred. Successful anaglyphic drawings require precision which is enhanced with a mechanical attachment.

I have also invented another version of a device for producing anaglyphic drawings on a copy sheet that will appear three dimensional when viewed through 3-D glasses having a first lens approximately red in color and a second lens approximately blue in color. This device comprises a reversible stencil sheet having a first side and a second side. The first side has the stencil designs of a first eye view of a reversible stereogram, and the second side has the stencil designs of a second eye view of the reversible stereogram. In a reversible stereogram the first eye view and the second eye view are mirror images of each other. The kind of three-dimensional objects that could make these reversible stereograms are bilaterally symmetrical with a plane of symmetry within the viewer's sagital plane, that is, the vertical plane that exists between your eyes and includes the tip of your nose when your head is in an upright position.

This device also includes a register such that the stencil designs in the reversible stencil sheet can be transferred to a copy sheet by successively aligning the copy sheet with the register and penciling around the stencil designs with a red-orange drawing instrument for the first eye view and with a green-blue drawing instrument for a second eye view. This device is very convenient for children to use because after the stencil design from one side is transferred, the stencil sheet is turned over and the same stencil design transferred again. This also requires less stencil sheet material and is less expensive to manufacture.

The reversible stencil sheet can also comprise a stencil design in the shape of the perimeter of the stencil sheet. In this way the user can pencil around the outer edge of the first side of the stencil sheet with a green-blue drawing instrument and turn it over, align it with the register and pencil around the outer edge with a red-orange drawing instrument. This version of the reversible stencil sheet can also have stencil designs within the stencil sheet as well. This is an advantage because the overall shape of the stencil sheet can be used to identify different groups of stencils.

The registers of the above stencil sheet and the reversible stencil sheet can also be coordinated registers. If two different stereograms have similar viewing angles, then you can superimpose the different stereograms, keeping the viewing angles the same, and the images would appear to intersect with each other. For example, a stereogram of a cube and a stereogram of a pyramid could be combined to look like a pyramid inside a cube if the viewing angles were similar. The coordinated register would allow a child to select different stencils and to combine them to form 3-D images that appear to intersect with each other.

The stencil sheet and the reversible stencil sheet can also have indicia thereon to show corresponding element points. These are a set of points, one on the first eye view and one on the second eye view that correspond to the same point on the three dimensional object. The corresponding element points can be transferred to the copy sheet with or without the rest of the stencil designs. Sets of corresponding element points can be connected to each other with lines or other generic stencil shapes can be drawn on them to greatly increase the number of potential designs possible. Thus children are able to experiment and intuitively learn about parallax.

I have also invented a method of producing an apparatus for making anaglyphic drawings on a copy sheet that will appear three dimensional when viewed through 3-D glasses having a first lens approximately red in color and a second lens approximately blue in color. This method comprises several steps. First a fused view is made by combining a first eye view and a second eye view of a stereogram by horizontally shifting the first eye view and the second eye view until those elements of the stereogram that would be seen as in the plane of the copy sheet are superimposed. If no elements are to be seen in the plane of the copy sheet then the elements may be shifted by projecting points that would be seen as in the plane of the copy sheet. Second, the fused view is registered. Third the first and second eye views are separated into component stencil designs, each part retaining the register. Fourth, the stencil designs and their associated registers are transferred to a stencil sheet. This device, i.e. the stencil sheet and register can be aligned on a copy sheet and the first eye transferred with a green-blue drawing instrument and the second eye view can be transferred with a red-orange drawing instrument. This device is thus as simple and inexpensive to manufacture as other kinds of stencil sheets but has the novel property of producing 3-D drawings.

The method of producing the above device can additionally comprise adding a coordinated register. This comprises an additional step of registering the fused views of several different stereograms all having substantially the same viewing angle. This coordinated register can be used in the third step when it is included with the first eye view and the second eye view to separate the designs into stencil designs. The coordinated register adds very little to the expense of manufacture but increases greatly the utility for combining different stencil designs.

I have also invented a process for producing anaglyphic drawings on a copy sheet that will appear three dimensional when viewed through 3-D glasses having a first lens approximately red in color and a second lens approximately blue in color. This process uses a stencil sheet having component stencil designs therein which when taken together form the first eye view and the second eye view of a stereogram. The stencil sheet also has a register such that the parts that make up the first and second eye views can be transferred to a copy sheet to reform the first and second eye views of the stereogram. The register also ensures the first and second eye views will be shifted horizontally on the copy sheet so that the portions that are to appear as in the plane of the copy sheet are superimposed. The steps of this process are first, placing the stencil sheet upon the copy sheet. Second, transferring in succession the component stencil designs that comprise the first eye view stencil design by registering a portion of the component stencil designs in the stencil sheet that form the first eye view stencil design and transferring that portion by penciling around the stencil design with a green-blue drawing instrument. Third, repeating the second step with the remaining portions of the stencil design until the first eye view stencil design is transferred. Fourth, transferring in succession the component stencil designs that comprise the second eye view stencil design by registering a portion of the component stencil designs in the stencil sheet that form the second eye view stencil design and transferring that portion by penciling around the stencil design with a red-orange drawing instrument. Fifth, repeating the fourth step with the remaining portions of the stencil design until the second eye view stencil design is transferred. This process can be learned by children for transferring stereograms to a copy sheet as anaglyphs.

I also have invented a process for producing an anaglyphic drawing on the copy sheet plus locating corresponding element points. These are pairs of points, one on the first eye view and one on the second eye view of the anaglyph that will appear to be the same point on the 3-D image. The first step is choosing a first point on the first eye view stencil design and then moving horizontally toward a first corresponding element point on the second eye view stencil design. The second step is locating a second set of corresponding element points on the anaglyph by repeating the first step with another point on the first eye view stencil design. The third step is connecting the first point on the first eye view stencil design to the second point on the first eye view stencil design with a green-blue drawing instrument and a straightedge. The fourth step is connecting the first corresponding element point on the second eye view stencil design to the second corresponding element point on the second eye view stencil design with a red-orange drawing instrument and a straightedge. This process can be carried out by the user indefinitely to create unique anaglyphic designs that may be added to anaglyphic drawings obtained by the methods previously described.

I additionally have invented a process of making an anaglyphic drawing by combining several different stencil designs of different stereograms all having substantially the same viewing angle and viewing distance by using a coordinated register. This is done by making a first anaglyphic drawing on a copy sheet as explained above, and then aligning the coordinated register of the second stencil sheet and transferring the second anaglyphic drawing upon the first drawing. Since the viewing angles and viewing distances are similar for both, the 3-D images will appear to intersect with each other. In this way a child can simply select which parts of the different stencil sheets to combine and create complex original 3-D drawings that would be very difficult to produce otherwise.

I have also invented a kit for producing anaglyphic drawings on a copy sheet that will appear three dimensional when viewed through 3-D glasses having a first lens approximately red in color and a second lens approximately blue in color comprising at least the following parts: at least one stencil sheet having component stencil designs of a first eye view and a second eye view stereogram and a register to align the component stencil designs on a copy sheet. At least one copy sheet; a tutorial having the steps: first placing the stencil sheet on the copy sheet; transferring in succession the component stencil designs that comprise the first eye view by registering a portion of the component stencil design that forms the first eye view and penciling around the stencil design with a red-orange drawing instrument. Next, repeating the above steps with the second eye view stencil design and a green-blue drawing instrument.

The kit explained above can also comprise a book wherein the stencil sheet, copy sheet and tutorial are it's pages. The register of the kit and/or book explained above can also have a coordinated register such that several stereogram stencil designs all having substantially the same viewing angle can be transferred to the copy sheet and superimposed so that the three dimensional images appear to intersect In this way a child having all the necessary materials at hand can select which parts of the stencils to transfer to the copy sheet and create his own custom 3-D pictures.

DRAWINGS

These and other features, aspects and advantages of the present invention will become better understood with reference to the following description, appended claims and accompanying drawings where:

FIG. 1 is a projective view of a three dimensional object comprising a base triangle, an upright square, an upper triangle, and a parallax index.

FIG. 2 is a schematic view showing two orthogonal views of the three dimensional object of FIG. 1, and a projected left eye view of a stereogram of the three dimensional object.

FIG. 3 is a plan view of a left eye view of a stereogram of the three dimensional object in FIG. 1.

FIG. 4 is a plan view of a right eye view of the stereogram of the three dimensional object in FIG. 1; FIGS. 3 and 4 form a stereogram.

FIG. 5 is a plan view of a fused view combining FIGS. 3 and 4 by superimposing the parallax indexes.

FIG. 6 is a plan view of one version of the invention, being a stencil sheet having line apertures and block cut-outs in the form of a stencil design of the stereogram of FIGS. 3 and 4.

FIG. 7 is a projective view of the stencil sheet of FIG. 6 upon a copy sheet which is in position to accept the transfer of the stencil design.

FIG. 8 is a sectional view of FIG. 7 taken substantially along the line 8 of FIG. 7 and viewed in the direction of the arrows.

FIG. 21 is a projective view of another three dimensional object comprising a base circle; three upright supports and an upper circle, and the parallax index of FIG. 1.

FIG. 22 is a plan view of the right eye view of a stereogram of the three dimensional object of FIG. 21.

FIG. 23 is a plan view of the left eye view of the stereogram of the three dimensional object in FIG. 21. FIGS.

22 and 23 are a stereogram having substantially the same viewing angle and viewing distance as the stereogram of FIGS. 3 and 4.

FIG. 24 is a fused view combining the left eye view and the right eye view of FIGS. 22 and 23 and the fused view and register of FIG. 5; all superimposed on the parallax indexes.

FIG. 25 is a plan view of a stencil sheet having the stencil design of the stereogram of FIGS. 22 and 23.

Figure 9:
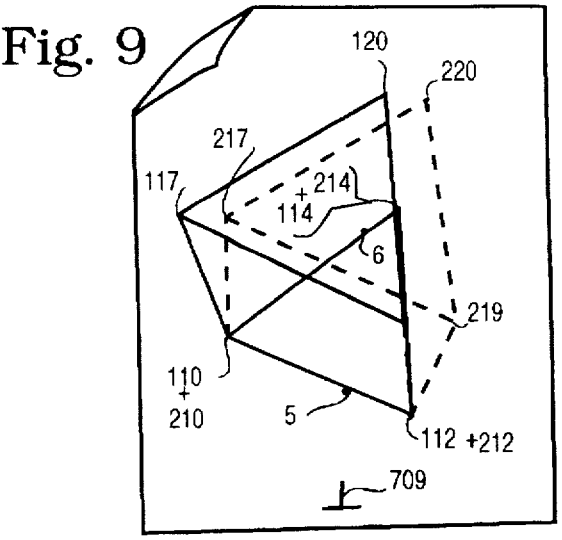
FIG. 9 is a plan view of the copy sheet of FIG. 7 with the transferred stencil design upon it; this is an anaglyphic drawing of the stereogram of FIGS. 3 and 4.
Figure 26:
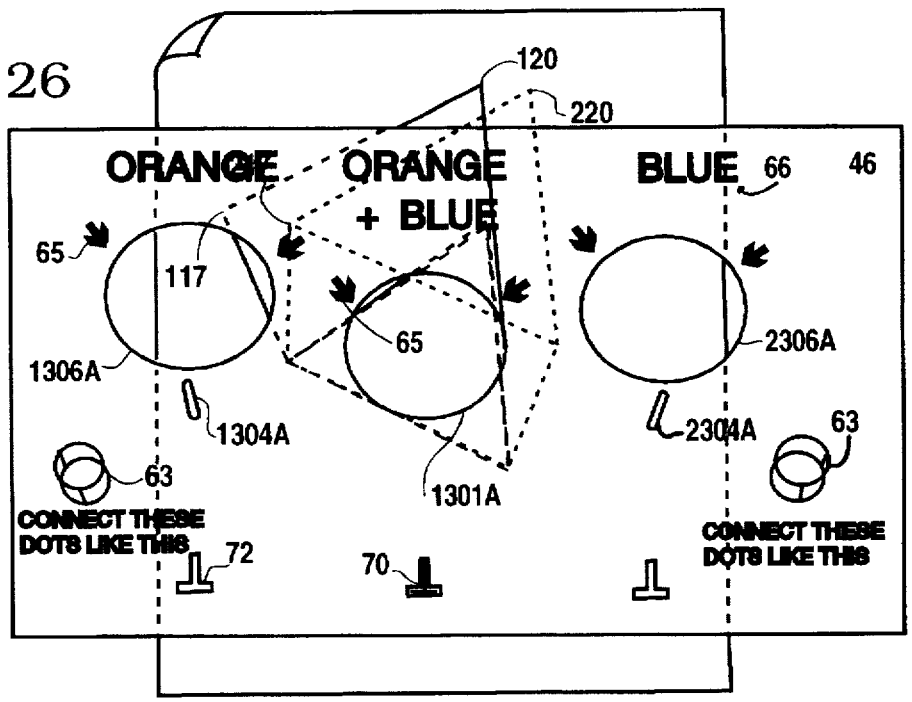

FIG. 26 is a plan view of the stencil sheet of FIG. 25 upon the anaglyphic drawing of FIG. 9 with the registry guide of the stencil sheet aligned on the registry mark of the copy sheet.

Figure 27:
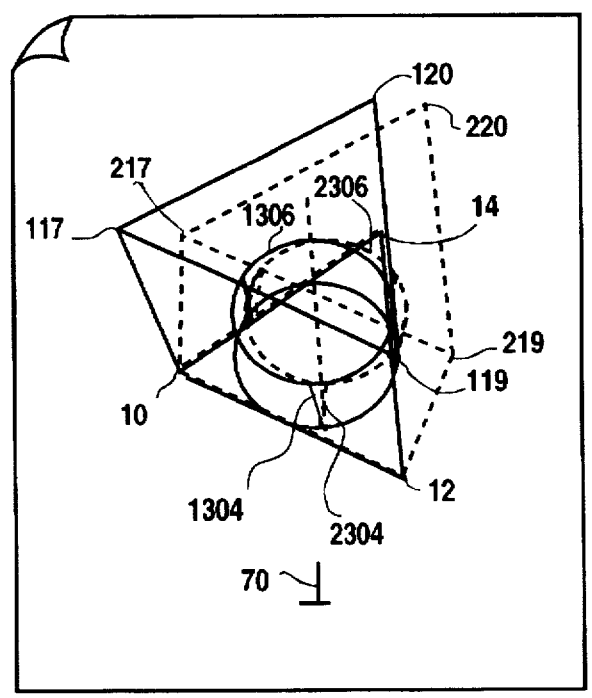

FIG. 27 is a plan view of the anaglyphic drawing produced by transferring the stencil design from the stencil sheet of FIG. 25 to the copy sheet of FIG. 26.

Figure 28:
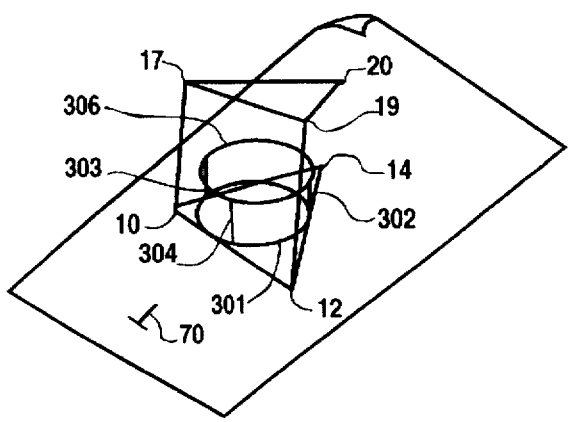

FIG. 28 is a projective view of the three dimensional object seen by viewing the anaglyphic drawing of FIG. 27 with 3-D glasses.

Figure 29:
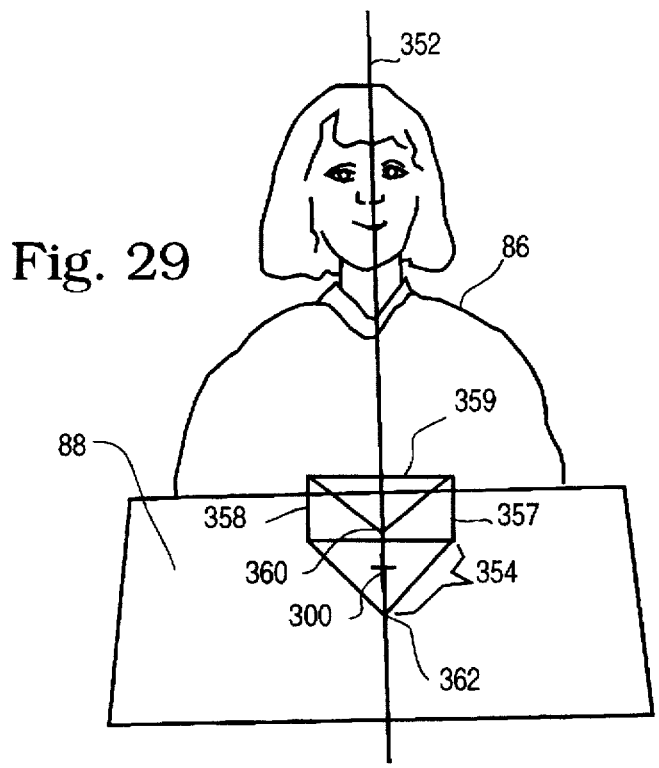

FIG. 29 is a schematic view of a viewer looking at a bilaterally symmetrical three dimensional object on a table top; one plane of symmetry is the viewers' sagital plane. The parallax index is in substantially the same position as in FIG. 1.

Figure 30:
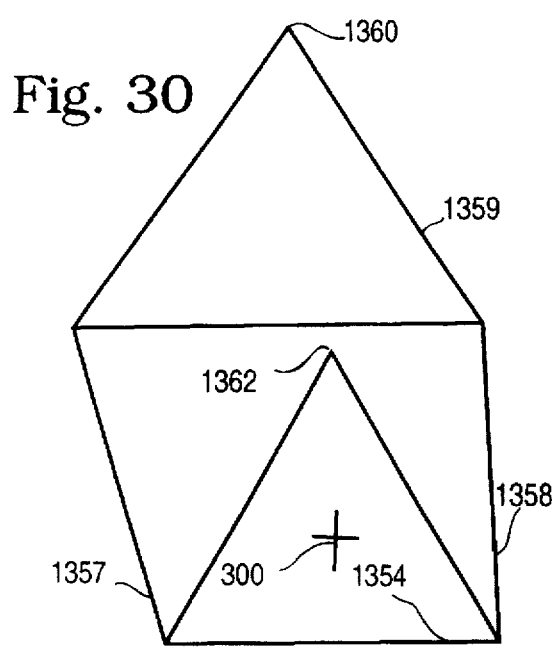

FIG. 30 is a plan view of a right eye view of a stereogram of the three dimensional object as seen by the viewer in FIG. 29.

Figure 31:
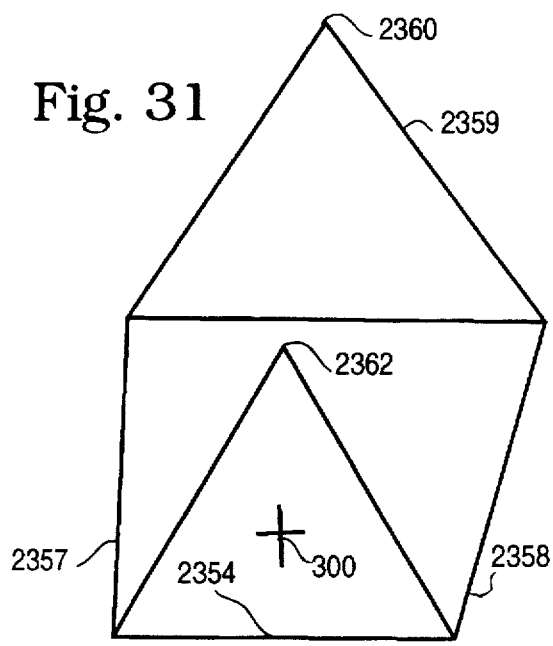

FIG. 31 is a plan view of the left eye view of the stereogram of FIG. 30. The viewing angle and viewing direction of this stereogram is substantially the same as the stereograms in FIGS. 3 and 4; and FIGS. 22 and 23.

Figure 32:
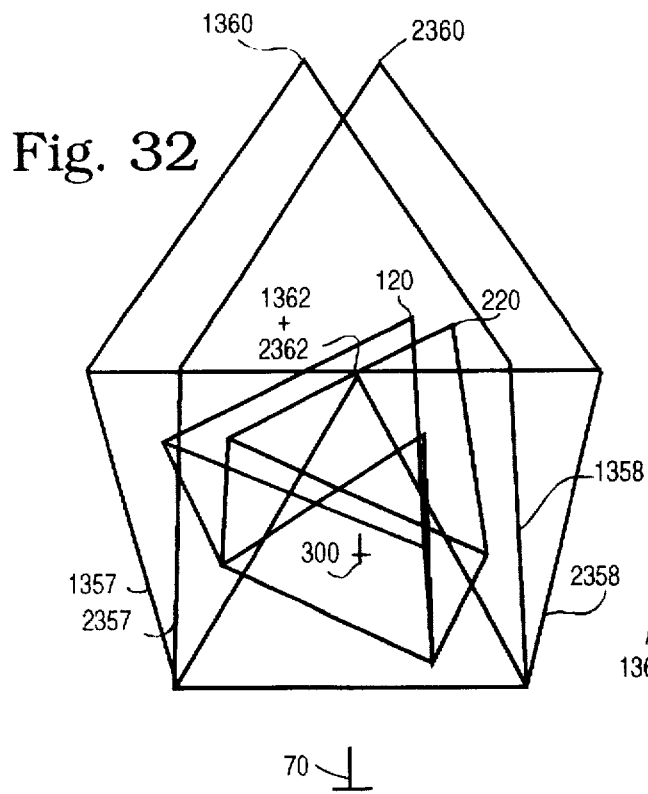

FIG. 32 is a plan view of a fused view combining the fused view and register of FIG. 5 with the fused view of the stereogram of FIGS. 30 and 31. The parallax index of all the figures are superimposed.

Figure 33:
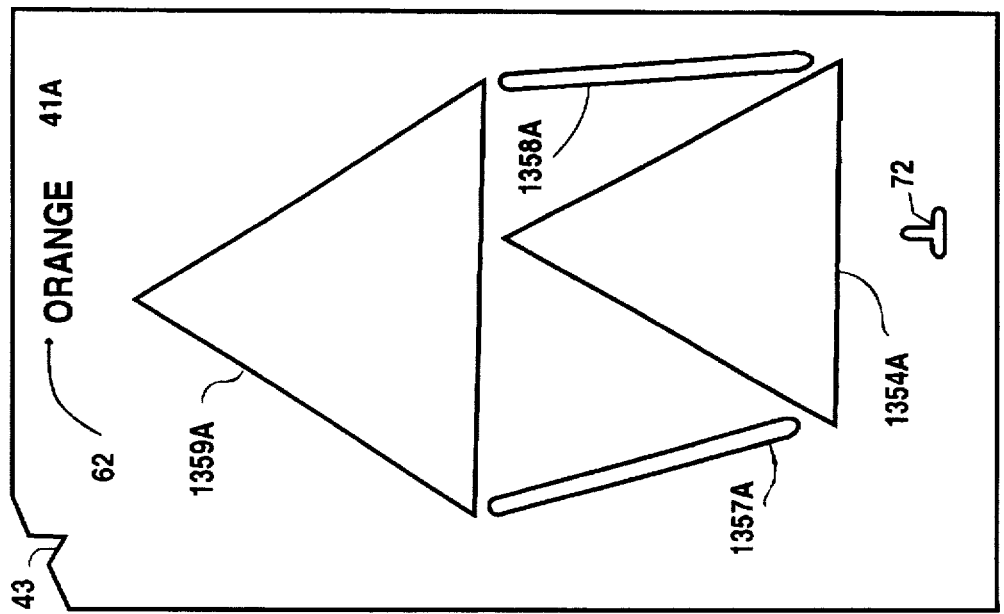

FIG. 33 is a plan view of another version of the invention, being a first side of a reversible stencil sheet having the stencil design of the right eye view of the stereogram of FIG. 30.

Figure 34:
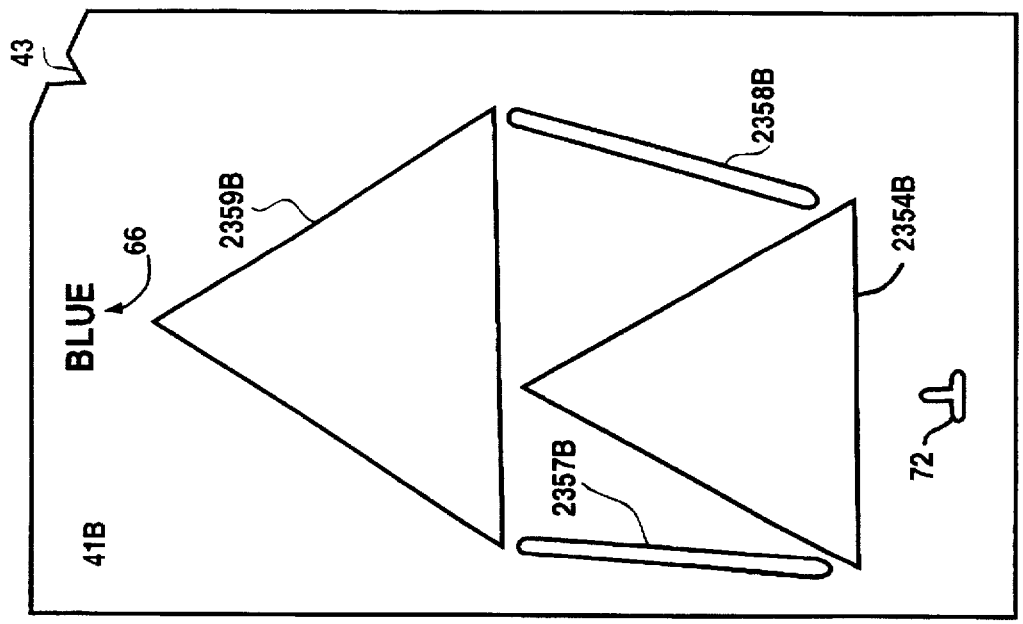

FIG. 34 is a plan view of the second side of the reversible stencil sheet of FIG. 33, having the stencil design of the left eye view of the stereogram of FIG. 31.

Figure 35:
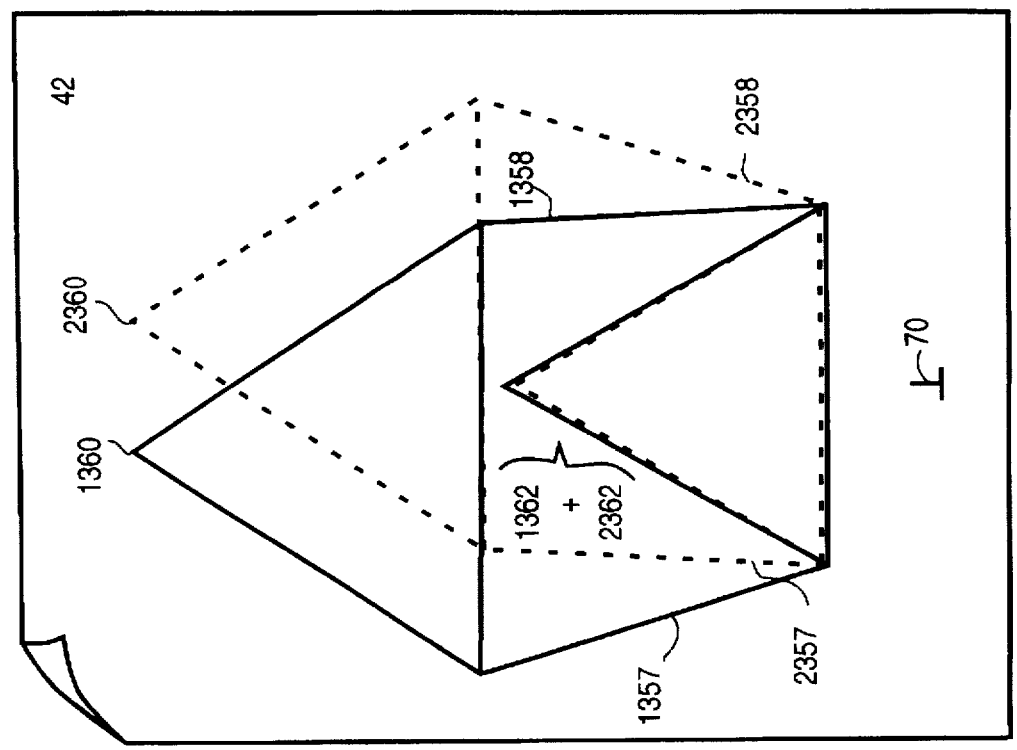

FIG. 35 is a plan view of an anaglyphic drawing made by transferring the stencil design of FIGS. 33 and 34 to the copy sheet.

Figure 36:
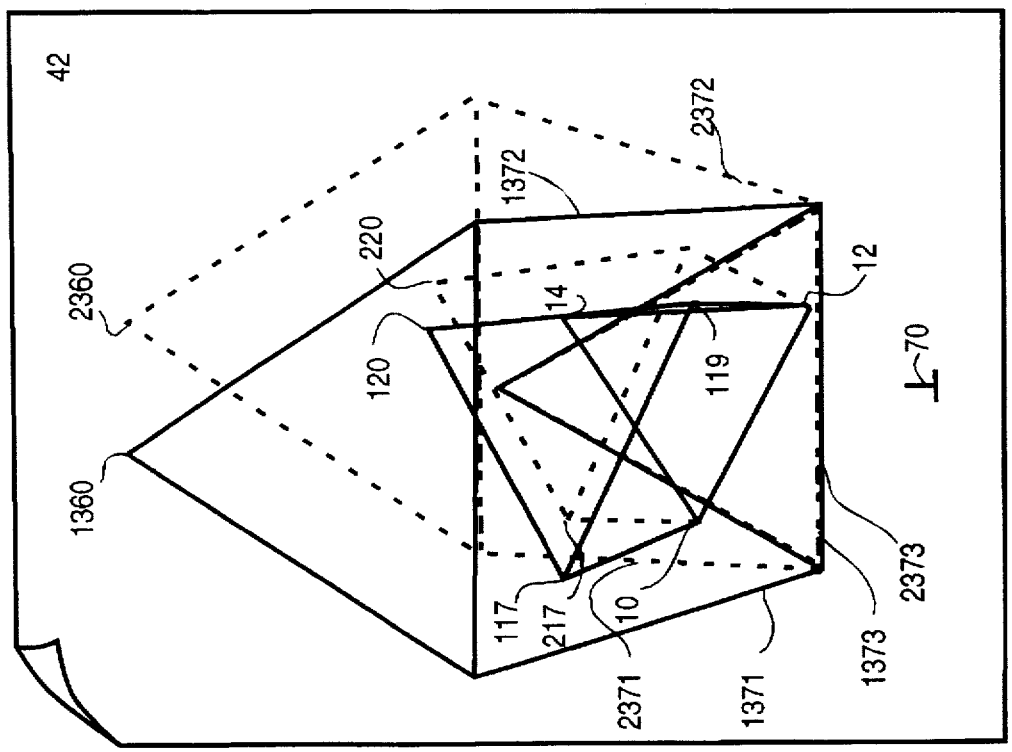

FIG. 36 is a plan view of the anaglyphic drawing of FIG. 35 with the addition of the stencil design transferred in register from the stencil sheet of FIG. 6.

Figure 37:
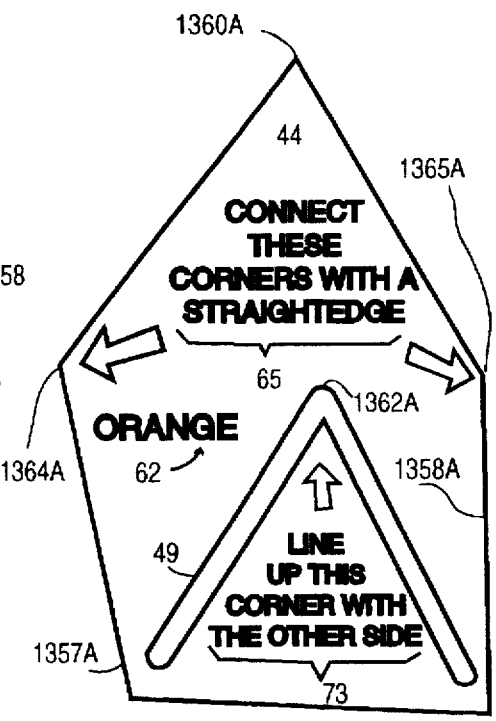

FIG. 37 is a plan view of another version of the reversible stencil sheet of FIGS. 33 and 34.

Figure 38:
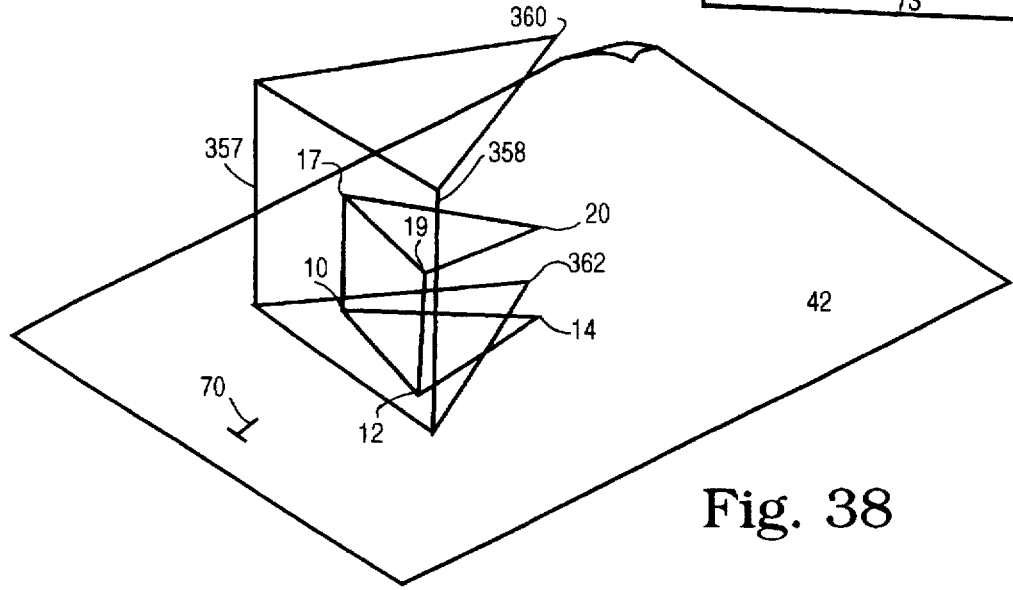

FIG. 38 is a schematic view of the three dimensional object seen by viewing the anaglyphic drawing of FIG. 36 with 3-D glasses. The image appears to be the the three dimensional object of FIG. 1 intersected with the three dimensional object on the table top of FIG. 29.

Figure 39:
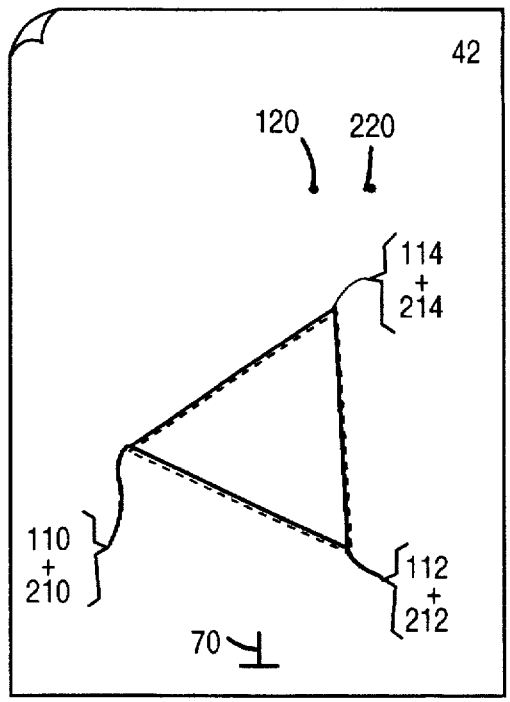

FIG. 39 is a plan view of another version of an anaglyphic drawing produced on a copy sheet with the stencil sheet of FIG. 6 made by transferring selected portions of the stencil design.

Figure 40:
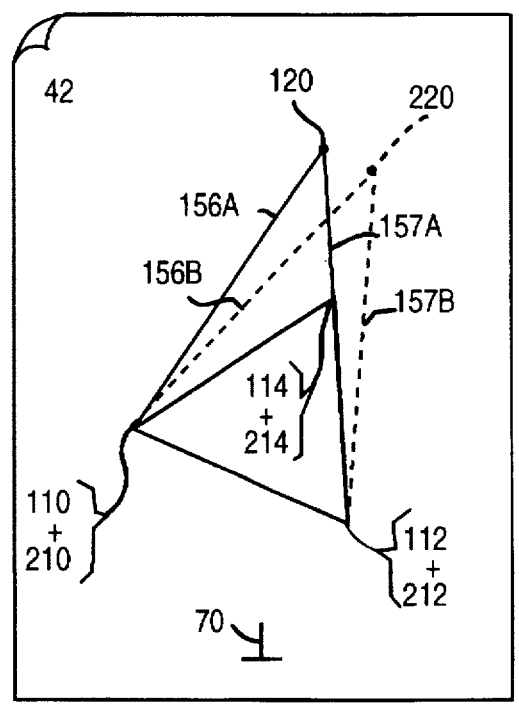

FIG. 40 is a plan view of another version of an anaglyphic drawing produced on the copy sheet of FIG. 39 produced by drawing lines to connect different elements together.

Figure 41:
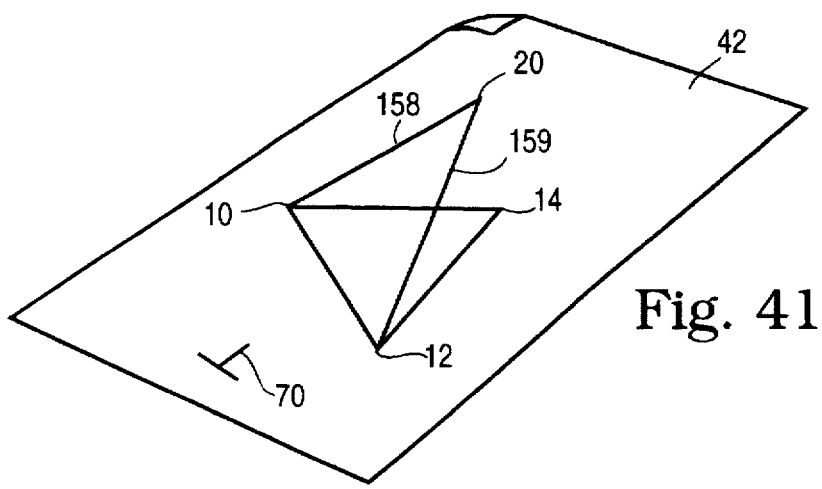

FIG. 41 is a schematic view of the three dimensional object seen by viewing the anaglyphic drawing of FIG. 40 with 3-D glasses.

Figure 42:
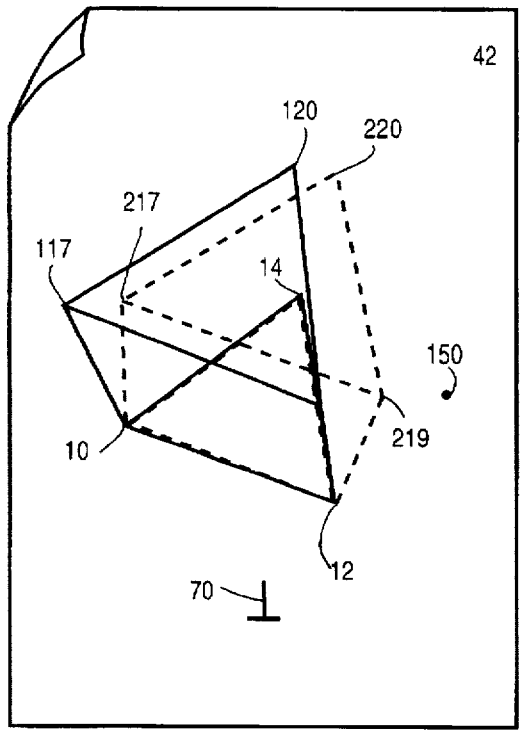

FIG. 42 is a plan view of another version of an anaglyphic drawing produced on a copy sheet with the stencil sheet of FIG. 6; and addition of a dot.

Figure 43:
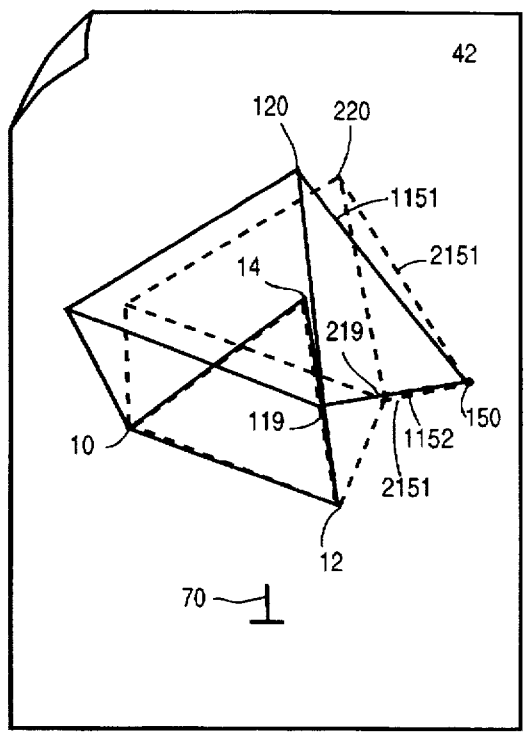

FIG. 43 is a plan view of another anaglyphic drawing produced by connecting elements of the right eye view and the left eye view to the dot.

Figure 44:
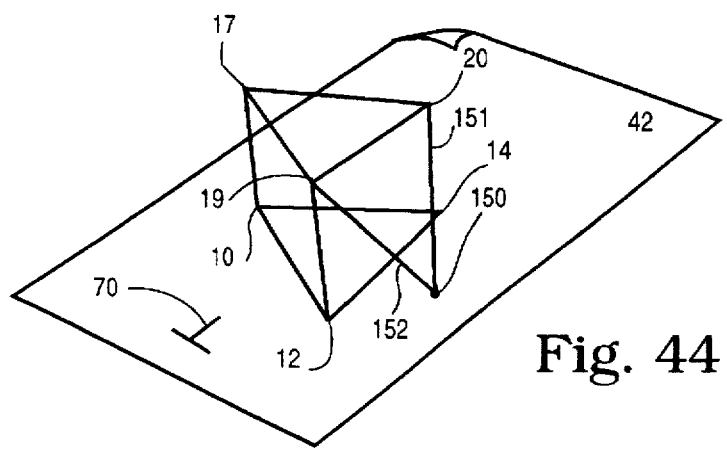

FIG. 44 is a schematic view of the three dimensional object seen when viewing the anaglyphic drawing of FIG. 43 with 3-D glasses.

Figure 45:
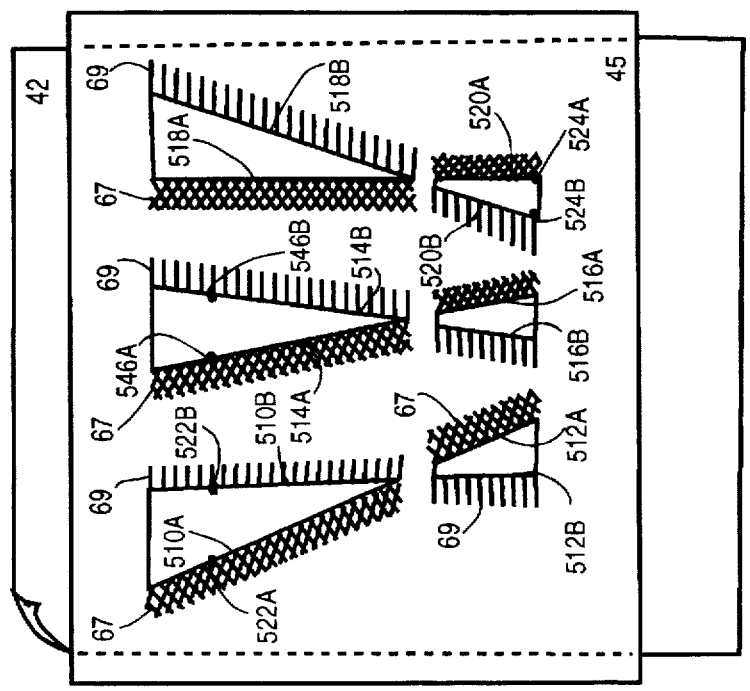

FIG. 45 is a plan view of another version of the invention showing a stencil sheet with stencil designs of a stereogram upon a copy sheet.

Figure 46:
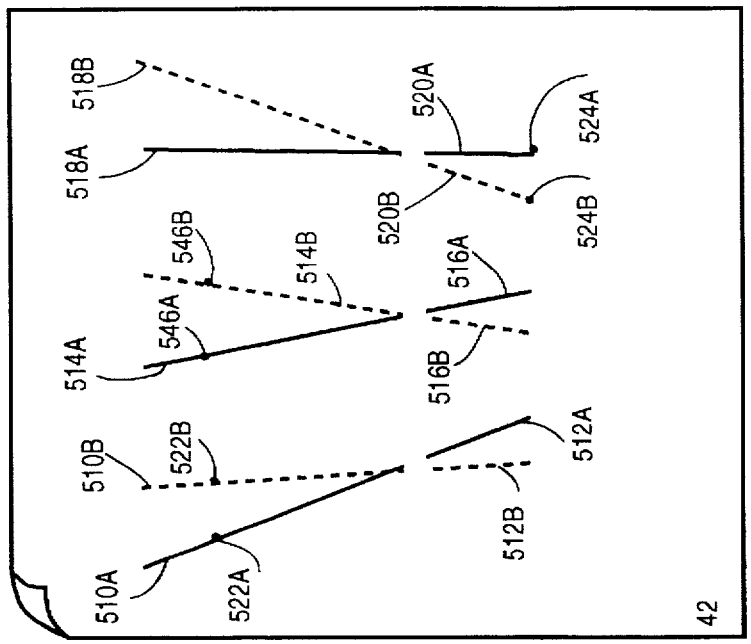

FIG. 46 is a plan view of an anaglyphic drawing on the copy sheet of FIG. 45 transferred from the stencil sheet of FIG. 45.

Figure 47:
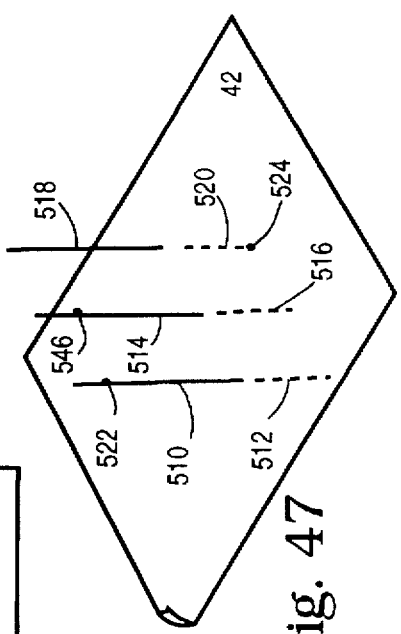

FIG. 47 is a schematic view of the three dimensional object seen by viewing the anaglyphic drawing on the copy sheet of FIG. 46 with 3-D glasses.

Figure 48:
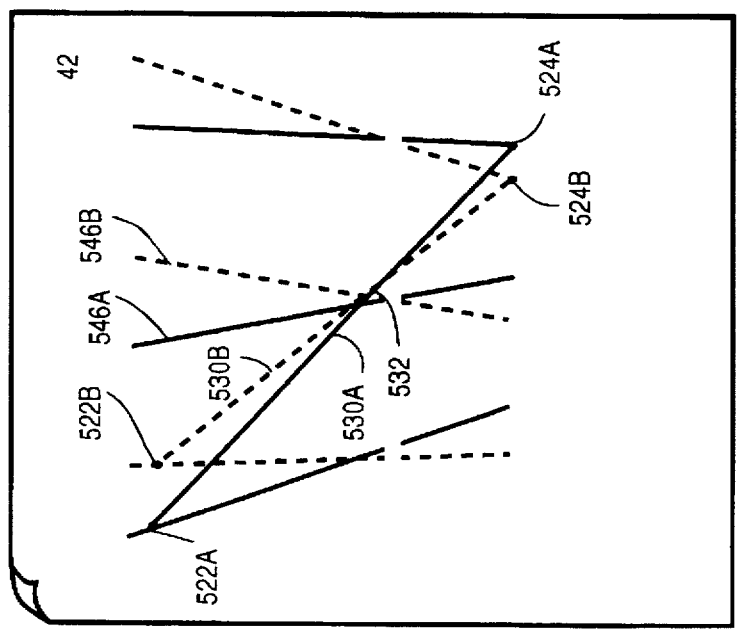

FIG. 48 is a plan view of another anaglyphic drawing produced by the addition of two lines on the copy sheet of FIG. 46.

Figure 49:
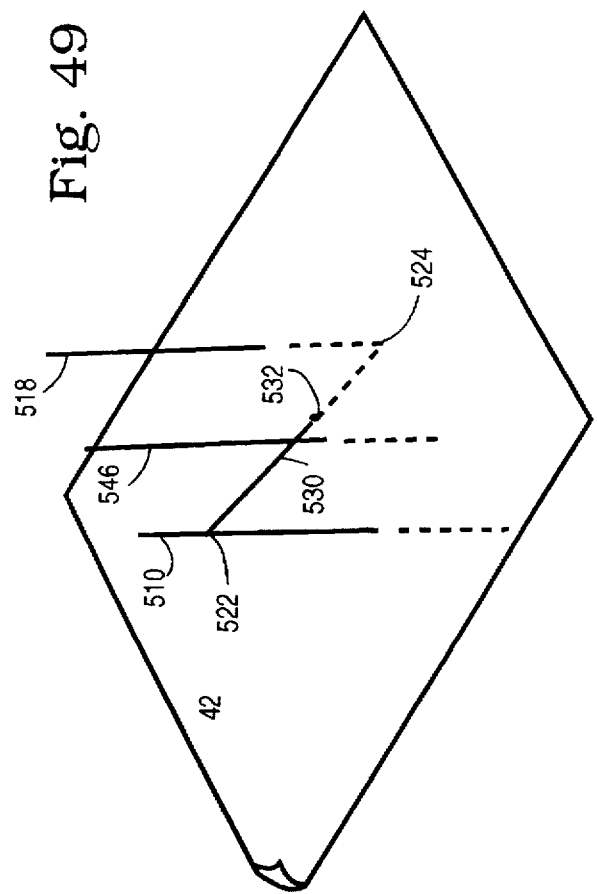

FIG. 49 is a schematic view of the three dimensional object seen by viewing the anaglyphic drawing on the copy sheet of FIG. 48 with 3-D glasses.

Figure 50:
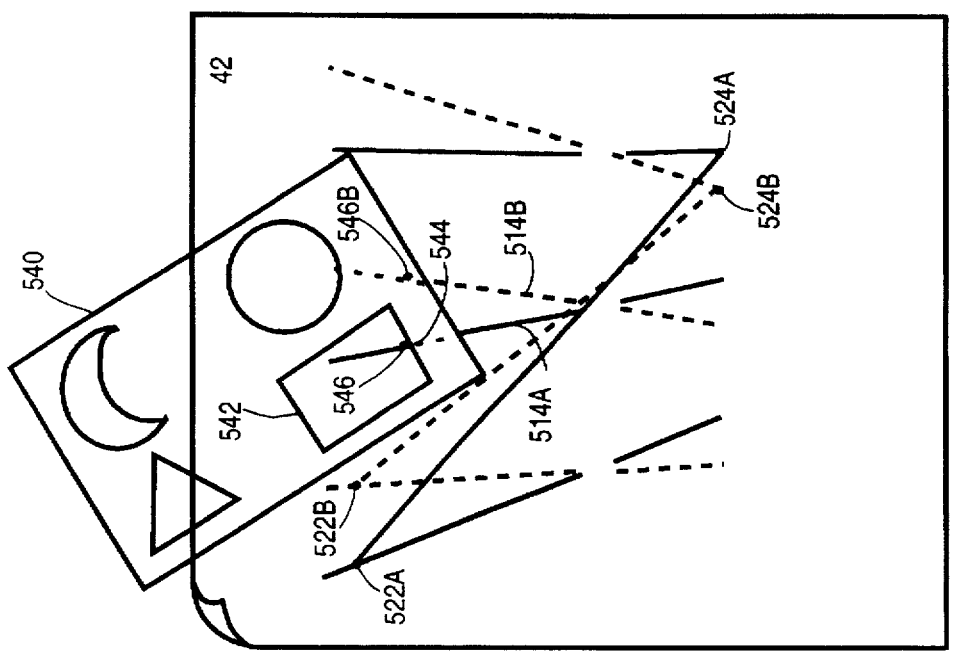

FIG. 50 is a plan view of the anaglyphic drawing of FIG. 48 with the addition of a generic stencil sheet.

Figure 51:
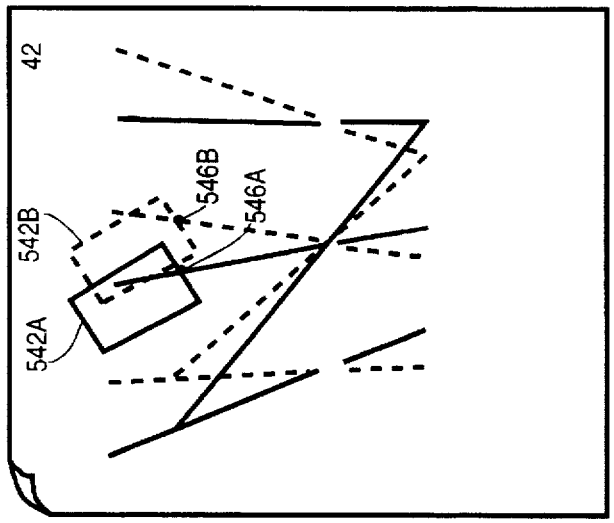

FIG. 51 is a plan view of another anaglyphic drawing produced by the addition of a stencil design transferred from the generic stencil sheet of FIG. 51 on the anaglyphic drawing of FIG. 48.

Figure 52:
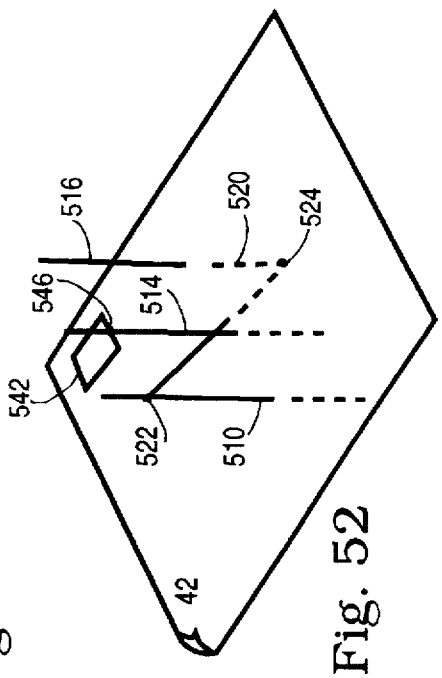

FIG. 52 is a schematic view of the three dimensional object seen by viewing the anaglyphic drawing of FIG. 51 with 3-D glasses.

FIG. 53 is a projective view of another version of the invention: a kit for producing anaglyphic drawings on a copy sheet with the stencil sheet forming the pages of a book.

FIG. 54 is a sectional view of the stencil kit of FIG. 53 taken substantially through the line 54 and viewed in the direction of the arrows.

DESCRIPTION

Definitions

L.E.V.: abbreviation of "left eye view".

R.E.V.: abbreviation of "right eye view".

Fused design: The L.E.V. and R.E.V. of a stereogram horizontally shifted so that those elements of the 3-dimensional image that would appear to be in the plane of the surface supporting the stereogram are superimposed.

Anaglyph: a fused design having the L.E.V. and the R.E.V. in different complementary colors.

Parallax index: a reference mark to establish a set distance and angle from the eyes of the viewer.

Coordinated fused design: the combination of two or more fused designs having substantially the same viewing angle so that their parallax indexes are superimposed. The elements will have the same degree of parallax with each other.

Component stencil design: within one or more stencil sheets any combination of block cut-outs, line apertures, dot apertures and/or instructions e.g. "connect this point to that one". The component stencil designs can be transferred with a register to form a composite stencil design.

Register: an aligner to properly orient the component stencil design with a fused design and to aid in transferring it to a copy sheet to form the composite stencil design.

Coordinated register: an aligner to properly orient the component stencil designs of different stereograms having substantially the same viewing angle with a coordinated fused design and to aid in transferring them to a copy sheet.

Register guide: an aperture or indicia on a stencil sheet associated with the component stencil design to help align the copy sheet with the component stencil designs.

Register mark: a mark on a copy sheet to align the copy sheet with the register guide within a stencil sheet.

Register platform: a mechanical method of engaging and registering the stencil sheet with the copy sheet for transferring the component stencil design. The copy sheet is attached to the register platform which engages the register guide.

Corresponding element points: on a stereogram, a pair of points, one on the L.E.V. and one on the R.E.V. that together form the same point on the 3-dimensional image. The pair of points are shifted horizontally of each other.

An anaglyphic drawing device is described such that the L.E.V. and the R.E.V. of a stereogram can be transferred to a copy sheet as an anaglyph. As required, detailed embodiments of the present invention are disclosed herein. It is to be understood, however, that the disclosed embodiments are merely exemplary of the invention, which may be embodied in various forms. Therefore, specific structural and functional details disclosed herein are not to be interpreted as limiting, but rather as a basis for teaching one skilled in the art to variously employ the present invention in virtually any appropriately detailed system or structure.

FIG. 1 is the projective view of a 3-dimensional object consisting of a base equilateral triangle with angles 10, 12 and 14. The base triangle is co-planer with a surface such as a table top. The points 5 and 6 on the base triangle are contained in the sagital plane of a viewer (not shown) with point 6 being more distant. On the side 10-12 of the triangle is an upright square attached perpendicularly with corners of 10, 12, 17 and 19. At the top of this upright square is an upper triangle with angles at 17, 19 and 20. This upper triangle is attached perpendicularly to the upright square at edge 17-19. The upper triangle is suspended directly above the base triangle 10-12-14.

The parallax index 300 is a point that lies within a vertical axis in line with the sagital plane of the viewer and a horizontal axis that is approximately in the center of the base triangle and is used in later steps to orient other 3-dimensional objects to this object. Parallax index 300 is not part of the 3-dimensional object.

FIG. 2 is a schematic view of the graphical method of making the L.E.V. of a stereogram of the 3-dimensional object of FIG. 1 and the parallax index 300. FIG. 2 contains two orthogonal views of the object of FIG. 1, one a side view 90 and below a base view 91. Side view 90 has two vertical sections spanning points 12-19 and points 10-17 corresponding to the upright square 10-12-17-19; and two horizontal sections spanning points 12-10-14 corresponding to the base triangle and 19-17-20 corresponding to the upper triangle.

The viewer's eyes 87 are seen in profile, and are superimposed. Projected line of sight 87A originates with the viewer's eyes 87 and intersects with point 19 on the orthogonal side view 90 and terminates on the horizontal plane of the base triangle forming a 70 degree viewing angle 92. Two more projected lines from points 17 and 20 to the plane of the base triangle are parallel to the line 87A and are also 70 degrees each. It is also possible to draw separate projected lines 87A from the viewer's eyes 87 through each point of the side orthogonal view 90 and use these in the steps that follow.

The base view 91 is identical to the base triangle 10-12-14 since the upper triangle 17-19-20 is the same size and is suspended directly above. The base triangle 10-12-14 is aligned with projected lines 12A, 10A and 14A. These lines 12A, 10A and 14A are projected vertically downward from the side view 90. In the bottom section, the viewer's eyes 87 are seen in section, the upper being the left eye 87L and the bottom being the right eye 87R. The profile eyes 87 are vertically in line with sectional eyes 87L and 87R. The parallax index 300 is in the approximate center of the base triangle 10-12-14. It is also equidistant from each eye 87L and 87R. The parallax index 300 is used to align different stereogram designs and to align the register as will be described below.

The L.E.V. stereogram is produced in FIG. 2 by projecting straight lines from the left eye 87L through the following: point 10, terminating at line 17A on the point 217; point 14, terminating at the line 20A on the point 220; and point 12, terminating at the line 19A at the point 219. These points: 217, 220 and 219 form the corners of the upper triangle in the L.E.V. stereogram. The R.E.V. of the stereogram is similarly made by using the right eye 87R.

For the example in FIG. 2 the viewing distance between the eyes 87 and the 3-dimensional object has been greatly reduced to fit on the page of the drawing. The average inter-pupillary distance is 2¾ inches and a typical viewing distance from the eye to the page for an adult is approximately 16 to 18 inches. FIGS. 3 and 4 are respectively the R.E.V. and the L.E.V. of a stereogram of the 3-dimensional object of FIG. 1. The viewing angle 92 is approximately 66 degrees and the viewing distance is approximately 16 inches.

Establishing the parallax index for stereograms obtained in other ways will occur to those skilled in the art. For example, in photography a split lens camera can be set up to take a series of pictures of three dimensional objects. First, a stereo picture of the parallax index is taken, then stereo pictures of different three dimensional objects placed about the parallax index are taken. After developing the pictures, the L.E.V. and R.E.V. pictures of the parallax index can be superimposed on the L.E.V. and R.E.V. of the pictures of the three dimensional objects. These pictures can then be used to make stencil designs with registers and coordinated registers as is described below.

The three dimensional object of FIG. 1 corresponds to the stereogram of FIGS. 3 and 4 as follows: the base triangle of FIG. 1 (10-12-14) corresponds to FIG. 3 (110-112-114), and FIG. 4 (210-212-214). The upright square of FIG. 1 (10-12-19-17) corresponds to FIG. 3 (110-112-119-117) and FIG. 4 (210-212-219-217). The upper triange of FIG. 1 (17-19-20) corresponds to FIG. 3 (117-119-120) and FIG. 4 (217-219-220).

FIG. 5 is a plan view of a fused design combining FIGS. 3 and 4 by superimposing the base triangle of FIG. 3 (110-112-114) upon the base triangle of FIG. 4 (210-212-214) or by superimposing parallax index 300. A register mark 70 is added to reorient all the parts of the stereogram in the next steps.

Stencil sheets are known in the art and can be made of cardboard, cover stock, plastic sheet, metal sheet, wood or composition board or the like. The apertures can be die-cut, hand-cut, laser-cut from the flat stock. The sheets may also be printed with indicia explaining how the stencils are to be used and how they may be combined with other stencils and/or embellished. Stencil sheets may also be cast by injection molding a thermoplastic or a chemical-cure plastic material. The initial expense of the mold construction can be balanced by the high volume of accurate stencils that can be reasonably produced.

FIG. 6 is a plan view of a stencil sheet 40 with various stencil designs therein and indica thereon. The stencil designs consist of block cut-outs in which a drawing instrument pencils around the periphery of the aperture; and line apertures that are narrow enough to admit a drawing instrument such as a pencil to be guided along. Line aperture 58 forms the upper triangle portion of FIG. 3 (117-120-119) with points 117A,120A, and 119A. Line aperture 60 forms the upper triangle portion of FIG. 4 (217-220-219) with points 217A, 220A, and 219A. Block cut-out 51 forms the upright square of FIG. 3, 110-112-119-117 with points 110A, 112A, 119A and 117A. Block cut-out 56 forms the upright square of FIG. 4, 210-217-219-212 with points 210A, 217A, 219A and 212A.

A small tab of stencil sheet such as between the block cut-out 51 and line aperture 58 separating the point 219A is necessary to maintain the integrity of the stencil sheet. The stencil designs will appear 3-dimensional as long as the tabs are similarly placed for each eye view of the stereogram. Block cut-out 53 forms base triangle of FIG. 3 (110-112-114) and FIG. 4 (210-212-214).

The registry guide 72 conforms to the register mark 70 of FIG. 5 and is in the same position relative to the component stencil designs as the register mark 70 is to the various parts of the fused view of FIG. 5. One stencil sheet can also have the stencil designs of several different stereograms, each with their own registers. This is especially useful for several small-sized stereograms.

Indica 62 "orange" refers to the color made by the drawing instrument to transfer the block cut-out 51 and line aperture 58 to the copy sheet. Likewise, indica 66 "blue" refers to the green-blue color made by the drawing instrument to transfer the block cut-out 56 and line aperture 60 to the copy sheet. Indica 64 "orange+blue" shows that the associated block cut-out 53 should be transferred with both colors. The combination of green-blue and orange is a reddish brown color. It is possible to transfer this with a brown colored pencil or even a graphite pencil since this portion is to be seen with both eyes.

The drawing instrument must be able to deposit a color on the copy sheet while penciling around the perimeter of the component stencil design. This would include crayons, pens, fiber-tipped markers and pens, and colored pencils and the like. Colored pencils are preferred since they are easily obtained and they have no ink to dry out. The main criterion for the color of the pigments is that suitable lens colors in the 3-D glasses will "wash out" the similar color.

This "washing out" phenomenon requires four things: first, a source of illumination; second, pigments deposited on a copy sheet that modify the light from the source of illumination; third, a lens material that modifies the light from the pigments and copy sheet; and forth, the eyes of the observer. In the radiation energy spectrum, the human eye is only able to see a band of wavelengths between about 380 and 750 nanometers (nm). A common source of illumination providing approximately this bandwidth is tungsten light. The pigments deposited on the copy sheet by the drawing instruments will absorb some of the wavelengths of this illumination and scatter other wavelengths. The pigments that make up the right eye view and the left eye view must be chosen so that a different part of the visible spectrum are absorbed and scattered from each other. For example, a first pigment could absorb light in the orange to red range (approximately 580 to 750 nm) and scatter light in the range from blue to green (approximately 420 to 530 nm), this pigment we might call "green-blue." A second pigment could be chosen to do the reverse of this, i.e. absorb wavelengths of radiant energy in the blue to green range (approximately 420 to 530 nm) and scatter wavelengths in the orange to red range (approximately 580 to 750 nm), this pigment we might call "orange-red."

The copy sheet has the purpose of supporting the pigments deposited by the drawing instruments. The color of the copy sheet will influence the appearance of the pigments. The copy sheet may be of any color, hue or intensity as long as there is sufficient contrast between the color of the copy sheet and either of the pigments deposited by the drawing instruments.

Next, suitable lens materials must be chosen. The lenses should contain pigments having the same refractive index as the resin to minimize scattering of light. In this way the lenses would be colored but transparent. The pigments in the lenses should also be chosen to absorb the scattered light from one pigment deposited on the copy sheet and transmit the scattered light from the other pigment deposited on the copy sheet. For example, on a light colored copy sheet, a first lens that absorbed wavelengths of light in the range of approximately 420 to 530 nm, and transmitted wavelengths in the range of approximately 580 to 750 nm would absorb the scattered light from the "green-blue" pigment on the copy sheet and transmit the scattered light from the "orange-red" pigment. This first lens would appear approximately red in color; the "green-blue" pigment on the copy sheet would appear dark gray in color when viewed through this first lens; and the "orange-red" color would disappear, or appear light colored on a light background when viewed through this first lens. A second lens that absorbed wavelengths of light in the range of approximately 580 to 750 nm and transmitted wavelengths in the range of approximately 420 to 530 nm would absorb the scattered light from the "orange-red" pigment on the copy sheet and transmit the scattered light from the "green-blue" pigment. This lens would appear approximately blue in color; the "orange-red" pigment on the copy sheet would appear dark gray in color when viewed through this second lens; and the "green-blue" color would disappear, or appear light colored on a light background when viewed through this second lens.

In actual practice, the complete transmission of the pigment on the copy sheet through the similarly colored lens may not be complete. The residual color, not completely washed out by the lens, and still seen on the copy sheet, is referred to as a "ghost image." If a predominant amount of the color is transmitted through the similarly colored lens, this "ghost image" is usually very faint and would not greatly interfere with stereopsis. Usually this occurs when a blue pigment is to be filtered out with a blue lens.

In viewing the different pigments, the observer interposes one of each lens in front of his left eye and right eye and views the illuminated copy sheet with the different pigments thereon. These lenses may be held by a frame resembling a pair of spectacles. If the copy sheet is white or light colored, the "green-blue" pigment will appear dark through the approximately red lens, and will appear white or will have disappeared through the approximately blue lens. In reverse, the "orange-red" pigment will appear dark through the approximately blue lens, and will appear white or will have disappeared through the approximately red lens. If the copy sheet is black, or very dark, the "green-blue" pigment will appear dark or will have disappeared through the approximately red lens, and will appear white, or light-colored through the approximately blue lens. In reverse, the "orange-red" pigment will appear dark or will have disappeared through the approximately blue lens, and will appear white, or light-colored through the approximately red lens. Any part of the drawing that to appear to be in the plane of the paper would need to be white or light colored so as to be visible to both eyes.

The lens material may be any optically suitable resin or glass that is commonly used for this purpose. A manufacturer of plastic film for lenses is Rosco, which is located at 36 Bush Avenue, Port Chester, N.Y. 10573. A suitable product is Roscolene in colors #859-Green Blue (Moonlight) and #818-Orange.

The 3-D glasses have been described in U.S. Pat. No. 4,620,770, Wexler, 1986. The colors of the drawing instrument are best described with the Pantone Matching System: Orange=PMS 151 and Green-blue=PMS 333. The preferred colored pencils are made by Empire Berol USA, of Brentwood, Tenn. 37027. With orange being #737; and green-blue being "non-photo blue" #761 1/2. In using these pencils it is found that the green-blue-colored pencil should be used with a lighter touch. It is also possible to formulate a pigment for a pencil containing green-blue and white to reduce the need to adjust the pressure on the green-blue pencil.

FIG. 7 is a projective view of the stencil sheet 40 of FIG. 6 upon a copy sheet 42. The copy sheet should be a smooth surface of light color. A buff or ivory color is better than white possibly because the yellowish color subdues the blue pigment of the green-blue pencil. The copy sheet can be any size or shape. Because the stencil sheets will be most likely used on a table, an easily available size is 8½ by 11 inches bond paper such as used in photocopy machines. Children often prefer small "travel" sizes that can be taken on trips or to school. Larger paper is also available such as 11 by 17 inches and can hold several anaglyphs or large anaglyphs. The copy sheet may also be pre-printed with a registry mark such as 70 in FIG. 9 and/or with instructions.

In FIG. 7, the registry guide 72 is in position to be transferred to the copy sheet 42 as a registry mark 70. The block cut-out 53 is likewise in position to be transferred to the copy sheet 42 by penciling around it's periphery with a green-blue pencil and an orange pencil or by a brown pencil.

FIG. 8 is a sectional view of FIG. 7 through the phantom line 8 and seen in the direction of the arrows. The thickness of the copy sheet has been exaggerated for this illustration. A phantom pencil 44 is shown as it would be when penciling around the periphery of the block cut-out 53 and transferring the stencil design to the copy sheet 42 below. FIG. 9 shows a plan view of copy sheet 42 with the completed anaglyphic design transferred. The dotted lines are transferred in green-blue, this being the L.E.V. and the solid lines are transferred in orange, this being the R.E.V.. The registry mark 70 can be transferred in either color or may be transferred with an erasable pencil and removed after completion of the anaglyphic drawing.

Figure 10:
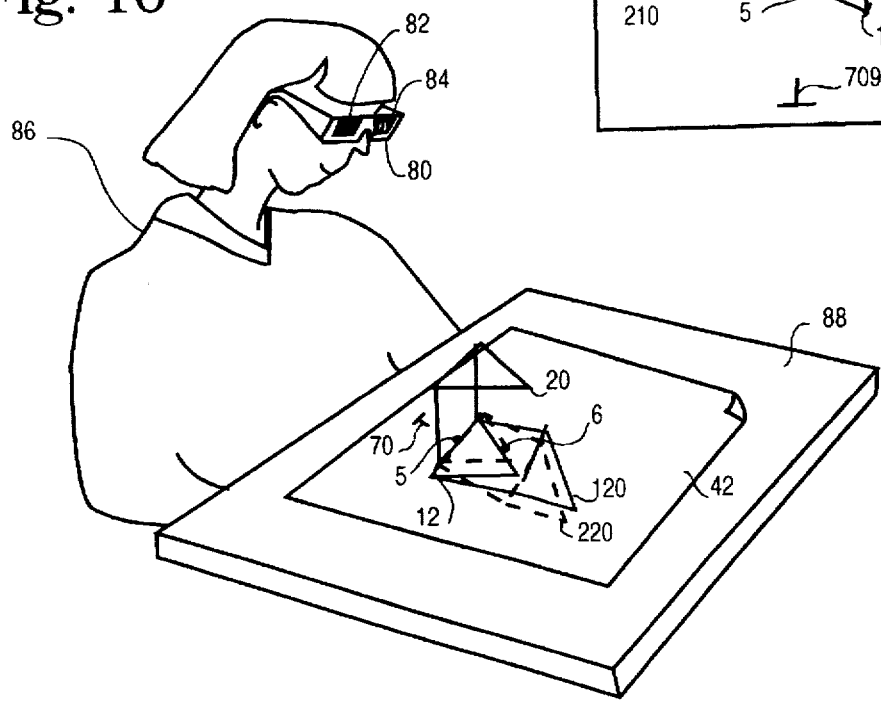
FIG. 10 is a schematic view of the anaglyphic drawing on the copy sheet of FIG. 9 as viewed by a person wearing 3-D glasses. The viewer sees the image of the three dimensional object in FIG. 1.

FIG. 10 is a schematic illustration of a viewer 86 wearing 3-D glasses 80 having a left lens approximately red in color 84, and a right lens approximately blue in color 82. Either the left eye or the right eye can have the red lens as long as the anaglyph is adjusted for this. For example with the red lens on the left eye, the L.E.V. should be green-blue . This is the convention in the United States. In Europe the left lens is conventionally blue or blue-green. Some anaglyphs will appear 3-dimensional when the 3-D glasses are reversed. This was called a pseudo-stereogram by Wheatstone.

The viewer 86 in FIG. 10 is sitting in front of a table 88 upon which is the copy sheet of FIG. 9. The 3-dimensional object that projects from the copy sheet 42 is the image seen by the viewer 86 and is similar to the projected image of FIG. 1. On the base triangle 10-12-14 the two points 6 and 5 are within the sagital plane of the viewer 86. Because the viewer can easily change his/ her viewing angle by moving his/her head, the 3-dimensional image will also change it's angles and seem to sway and bob as the viewer moves.

Figure 11:
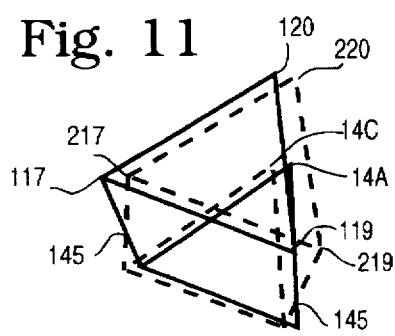
FIG. 11 is a plan view of a second anaglyphic drawing based on the stereogram of FIGS. 3 and 4.
Figure 12:
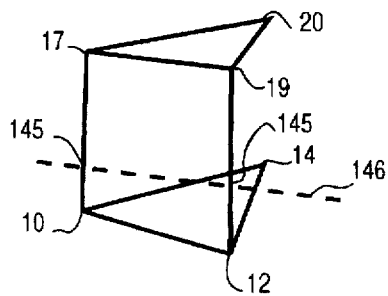
FIG. 12 is a projective view of the three dimensional image seen when viewing the anaglyphic drawing of FIG. 11 with 3-D glasses.

There is some latitude in making the fused view of a stereogram as the mind will make slight perceptional adjustments of what is seen. For example, the stereogram of FIGS. 3 and 4 could be shifted horizontally so that instead of superimposing on the base triangles, they could be superimposed halfway up, on the upward square. This could create the anaglyphic design of FIG. 11. The differences between this and FIG. 9 are the intersecting points 145 on the upright square. When this anaglyph is viewed in the same direction as FIG. 10, the base triangle would appear, as in FIG. 12, to be suspended below the plane of the copy sheet (dotted line 146), the upright square would be half above and half below the plane 146 and upper triangle suspended above the plane 146, but at a lower level than in FIG. 1.

Another way this can be accomplished when transferring the component stencil design is by adjusting the register. For example in FIG. 6 the register guide 72 of stencil sheet 40 can be transferred to the copy sheet 42 as the registry mark 70 which is used to transfer in register the R.E.V. stencil design in orange. Then a second registry mark 70 shifted horizontally to the left or right of the first registry mark 70 can be added. This shifted registry mark can be used to align the L.E.V. stencil design as it is transferred to the copy sheet in green-blue.

A register can also be added to any stencil sheet and the stencil designs transferred to a copy sheet as an anaglyph. If the same design is shifted horizontally and transferred in the two colors described, the stencil design will appear to float above or be submerged below the copy sheet.

Figure 13:
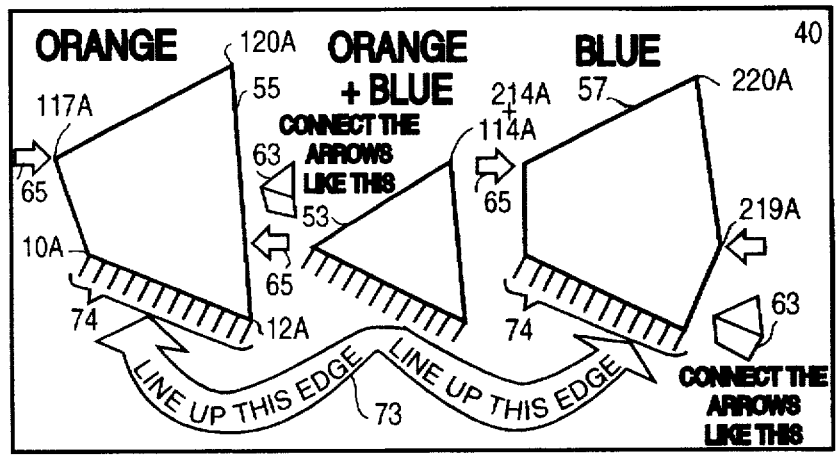
FIG. 13 is a plan view of another version of the stencil sheet of FIG. 6.

FIG. 13 is a plan view of another version of the stencil sheet 40 to produce the anaglyphic drawing of FIG. 9. This version comprises a stencil sheet 40 with three block cut-outs 53,55, and 57. The lower edge of all three block cut-outs have indica 74 and 73. Indica 73 "line up this edge" shows that the edge of the block cut-outs indicated by 74 (the series of small arrows) should be successively superimposed on the transferred drawing. The color of the drawing instrument is indicated above the block cut-outs as in FIG. 6. To complete the edge of the upper triangle as it abuts the upright square there are arrows 65 showing points to be connected with a straightedge. There is further indica 63 showing a picture of how the block cut-out would look with the arrow points 65 connected.

Figure 14:
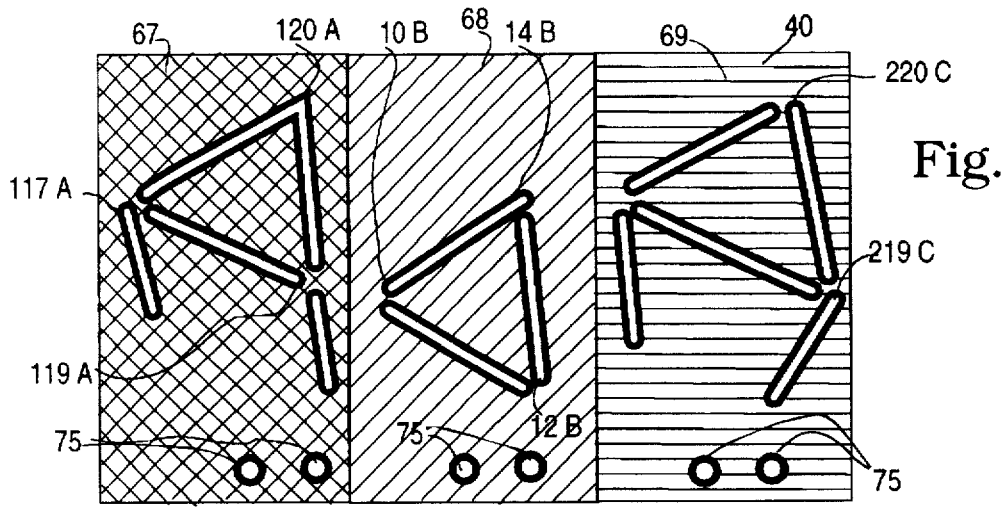
FIG. 14 is a plan view of another version of the stencil sheet of FIG. 6.

FIG. 14 is a plan view of another version of the stencil sheet 40 with line apertures therein to make the anaglyphic drawing of FIG. 9. The indica showing the color of the drawing instrument to be used is in three parts. The portion of the stencil design containing the R.E.V. is colored orange 67 (cross-hatched). The portion containing the L.E.V. is colored blue 69 (horizontal lines) and the portion containing the common L.E.V. and R.E.V., this being the base triangle 112A-114A-110A and 212A-214A-210A is colored brown 68 (diagonal lines). The color indica could also be limited to the adjacent area of the component stencil design. The advantage is that the correct color of drawing instrument can be selected based on the colored area of the stencil sheet. Thus reading skills are not needed. In this version the register takes the form of register guides as pairs of dot apertures 75 under each component stencil design. A first pair of these dots can be transferred to the copy sheet as a register mark (not shown) which is subsequently used to realign the next pair of dot apertures 75. In this way the dot apertures can be used as registry guide 72 and registry mark 70.

Figure 16:
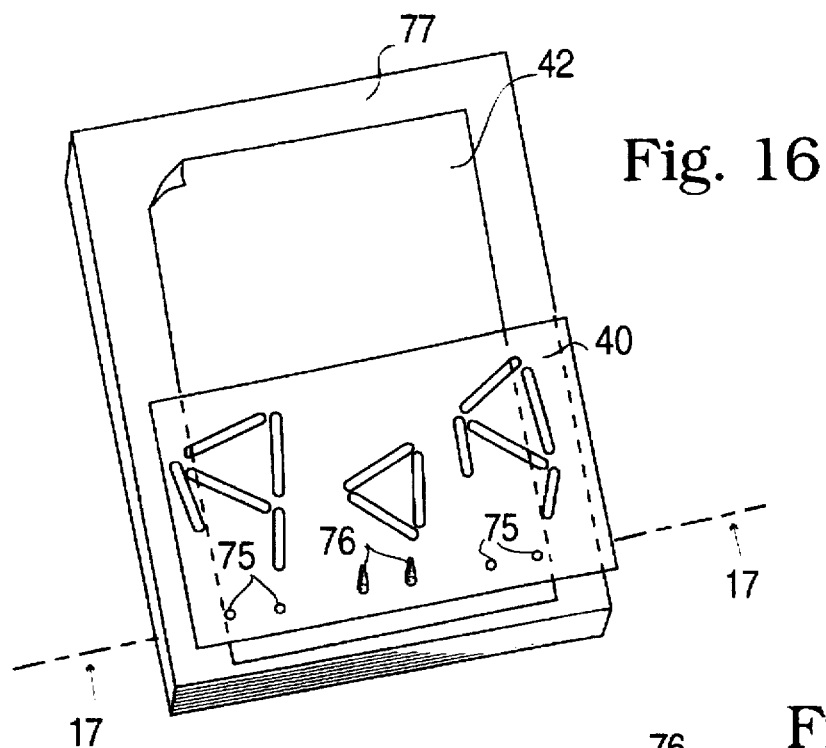
FIG. 16 is a projective view of the stencil sheet of FIG. 14 upon a copy sheet and a registry platform. The stencil sheet is in position to transfer the base triangle of the stereogram of FIG. 3 and 4.

FIG. 16 is a schematic view of stencil sheet 40 of FIG. 14, with a copy sheet 42 and a registry platform 77 and registry pins 76 but without the color indica to aid in the understanding of the registry platform. This version of the registry platform 77 is large enough to support the copy sheet 42 and that portion of the stencil sheet 40 that is currently being transferred to the copy sheet 42. The registry platform 77 can be made of a sturdy planar material such as cardboard, wood, metal, plastic, compositions board and/or the like. It should be hard enough so that the copy sheet 42 is not dented with pressure from the drawing instrument as this creates distortion that inhibits stereopsis. In this version the registry pins 76 protrude perpendicularly from the registry platform 77. Approximate dimensions of the registry pins 76 are from $\frac{1}{16}$ to $\frac{5}{32}$ inches in diameter and approximately $\frac{1}{8}$ inches in height. This version of the registry pins 76 must be able to perforate the copy sheet 42 and hold the stencil sheet 40 in alignment during transferring of the design. If the registry pins 76 are too long they could interfere with the drawing process. The registry pins should be an adequate distance apart. If they are too close, the possibility of rotational movement is increased. The approximate range for using copy sheets 42 of standard 8½ by 11 inch size would be from ½ to 4 inches apart with preferred distance of about two inches. The distance between registry pins 76 can also be used as a way of separating different sets of stencil sheets with the same parallax index 300, as will be described later. The registry pins 76 are made of firm material: plastic, metal, wood, ceramic, carbon fiber, combinations thereof or the like. The pointed end should be able to perforate a piece of bond paper, but not so pointed that it could easily perforate skin of the user. A preferred shape is that of the pointed end of a knitting needle. Other forms of registers can also be used to align the stencil designs. For another example, U.S. Pat. No. 4,205,849, Perkins, 1980, shows a large stencil sheet that folds in on itself, surrounding the copy sheet as a register.

Figure 17:
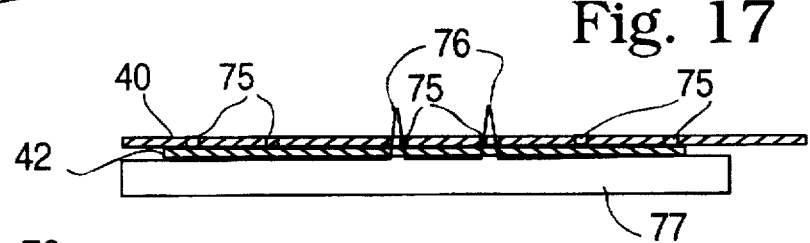
FIG. 17 is a sectional view of the copy sheet, registry platform and stencil sheet of FIG. 16 taken substantially along line 17 and seen in the direction of the arrows.
Figure 18:
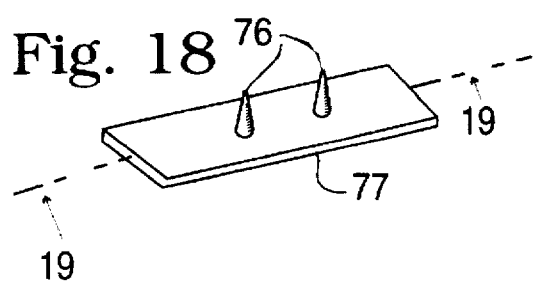
FIG. 18 is a projective view of another version of the registry platform of FIG. 16.
Figure 19:
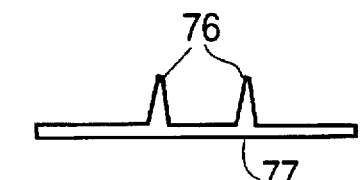
FIG. 19 is a sectional view of the registry platform of FIG. 18 taken substantially along line 19 and seen in the direction of the arrows.

FIG. 17 is a sectional view taken substantially along the line 17—17 of FIG. 16 and looking in the direction of the arrows. The thickness of the copy sheet 42 has been exaggerated for this illustration. The registry guides 75 are shown in section with the registry pins 76 perforating the copy sheet 42 and engaging the registry guides 75. FIG. 18 is another version of the registry platform 77. In this version the registry platform 77 is much smaller and would not serve the purpose of supporting the copy sheet 42 as a drawing surface. This registry platform 77 would need to be supported by another surface such as a table top. The same criterion for the registry pins would hold. The smaller registry platform 77 should be thin enough so that the copy sheet 42 and stencil sheet 40 can be relatively flat upon it. FIG. 19 is a sectional view taken substantially along the line 19—19 of FIG. 18 and looking in the direction of the arrows.

Figure 20:
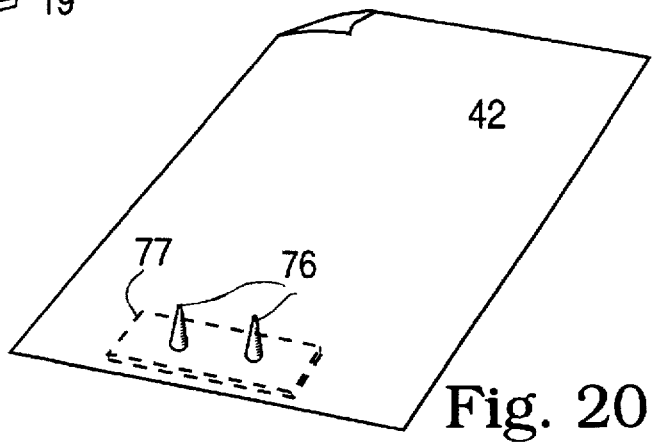
FIG. 20 is a projective view of the registry platform of FIG. 18 attached to a copy sheet.

FIG. 20 is a projective view of the copy sheet 42 engaged by the register of FIG. 18. The stencil sheet 40 would be placed on top with the registry pins 76 engaging the registry guides 75. The copy sheet 42 could also be attached to the registry platform 77 by other means, such as clips, adhesives, tabs, slots or the like so that the copy sheet would not be perforated by the registry pins 76, but still could use the registry pins 76 to engage the registry guides 75. Other versions of registry pins can include keys, for example an inverted "T" shaped key to engage the registry guide 72 of FIG. 7. As long as the registry pins are not required to simultaneously hold the copy sheet and align the copy sheet, many other key shapes to align the register guides are possible.

Figure 15:
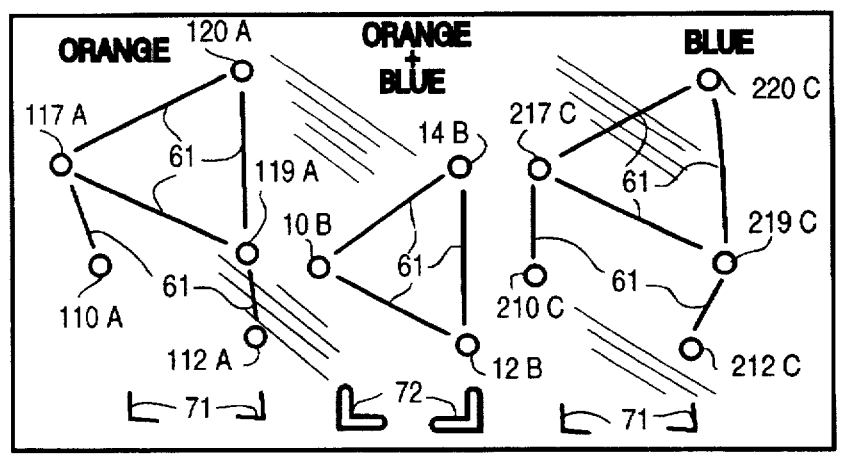
FIG. 15 is a plan view of another version of the stencil sheet of FIG. 6.

FIG. 15 is another version of the stencil sheet 40. This version has dot apertures at each corner of the stencil design to transfer -the angles of the stencil design. These dots are then connected with the correct colored drawing instrument and a straightedge. The stencil sheet has line indica 61 to show which dots are to be connected to form the anaglyphic drawing. The stencil sheet of FIG. 15 has another version of the register. In this case the stencil sheet 40 is made of a transparent material such as used to make plastic templates for the graphic arts. The registry guide 72 is used to transfer a registry mark (not shown) to the copy sheet. The registry mark on the copy sheet 42 is then matched with the registry guide 71 on the stencil sheet and the remaining stencil design is transferred. The advantage to using a transparent material is that the design to be transferred can be seen upon that which has already been transferred to the copy sheet 42. This also helps when combining different stencil sheets 40 with different stencil designs.

FIG. 21 is a projective view of a second 3-dimensional object. It consists of a base circle 301 co-planer with a surface such as a table top. Point 308 is on the circumference of the base circle 301 and a diagonal line that is within the sagital plane of a viewer (not shown). Parallax index 300 is in the center of the base circle. Three upright supports: 304, 302 and 303 are perpendicularly attached to the circumference of the circle at equal intervals. An upper circle 306 having the same diameter of base circle 301 is suspended directly above circle 301 and is perpendicularly attached to the upright supports.

FIGS. 22 and 23 are respectively the R.E.V. and L.E.V. of a stereogram of the 3-dimensional object in FIG. 21 having a viewing angle of 66 degrees and a viewing distance of approximately 16 inches. The base circle 301 of FIG. 21 is represented by circle 1301 in FIG. 22 and circle 2301 in FIG. 23, upper circle 306 of FIG. 21 is represented by circle 1306 in FIG. 22 and circle 2306 in FIG. 23. The upright supports 302, 303 and 304 of FIG. 21 are represented by supports 1302, 1303 and 1304 in FIG. 22 and by 2302, 2303 and 2304 in FIG. 23 respectively. FIG. 24 is a coordinated fused design of the stereogram of FIGS. 22 and 23 and the fused design of FIG. 5. The parallax index 300 of all the designs is superimposed and the register mark 70 of FIG. 5 is now associated with the fused view of FIGS. 22 and 23 which is now a coordinated register.

FIG. 25 is the plan view of a stencil sheet 46 having the component stencil designs of FIGS. 22 and 23 and the register of FIG. 24. Block cut-out 1301A is the base circle to be transferred with both orange and green-blue as the indica "orange and blue" 64 show. 1301A is coincident with 2301 of FIG. 23 and 1301 of FIG. 22. Block cut-out 2306A is the L.E.V. of the upper circle associated with the indica "blue" 66. The line apertures 1304A and 2304A are the stencil designs for the R.E.V. and L.E.V. respectively of the support 304 of FIG. 21. Arrow indica 65 with picture indica and legend "connect these dots like this" 63 show how the additional supports 303 and 302 are to be completed with a straightedge connecting the points as shown.

FIG. 26 is a plan view of the stencil sheet 46 of FIG. 25 upon the copy sheet 42 of FIG. 9 The registry mark 70 is aligned with the registry guide 72 of the stencil sheet 46. The stencil sheet 46 in FIG. 26 is positioned to transfer the coincident base circle 1301 and 2301 of the stereogram of FIGS. 22 and 23. This is done by penciling around the block cut out 1301A with both orange and green-blue. The remaining stencil designs would then be transferred successively with the appropriate color.

FIG. 27 is a plan view of the anaglyphic drawing obtained on the copy sheet 42 in FIG. 26. Because the viewing angle was the same for producing both stereograms, and the parallax index 300 was superimposed when taking the register 70, the final combined image will appear as in FIG. 28 when viewed through 3-D glasses. If the stereograms had had different viewing angles and/or the parallax indexes had not been superimposed the anaglyph may still appear 3-dimensional but one or both of the images would have been distorted. The advantage of the coordinated fused design and the coordinated register is that the user can select several different stencil designs and easily combine them to form complex anaglyphic drawings.

Another version of the invention is a reversible stencil sheet such that a first eye view stencil design is on the first side of the stencil sheet and a second eye view of the stereogram is on the second side of the stencil sheet, with both sides using the same apertures. To obtain a stereogram for this, a 3-dimensional object must be chosen which is bilaterally symmetrical with a plane of symmetry co-planer with the viewer's sagital plane.

FIG. 29 is a schematic view of a viewer 86 viewing a 3-dimensional object on a table 88. The object consists of a base equilateral triangle 354 on the table 88. The base of the triangle is toward the viewer 86 and the vertex 362 is farther away. The sagital plane 352 of the viewer 86 bisects the base triangle 354 with each side being the mirror image of the other. The parallax index 300 is the same distance from the viewer as in the previous examples with the same viewing angle of 66 degrees. The 3-dimensional object also has an upper triangle 359 suspended above and parallel to the base triangle 354 this upper triangle 359 has a vertex 360 that points away from the viewer. Two supports 357 and 358, each perpendicular to the triangles are attached to the two angles closest to the viewer 86. The sagital plane 352 of the viewer 86 bisects the 3-dimensional object making each side the mirror image of the other.

FIGS. 30 and 31 are the R.E.V. and L.E.V. respectively of a stereogram of the 3-dimensional object of FIG. 29 as seen by the viewer 86. The supports 357 and 358 on the 3-dimensional object in FIG. 29 correspond to R.E.V., FIG. 30, 1357 and 1358 and L.E.V.,FIG. 31, 2357 and 2358 respectively. The vertex 362 of the base triangle 354 of FIG. 29 corresponds to point 1362 on FIG. 30 and point 2362 on FIG. 31. The vertex of the upper triangle 360 of FIG. 29 corresponds to point 1360 on FIG. 30 and point 2360 on FIG. 31.

FIG. 32 is a plan view of a coordinated fused design, combining the fused design of FIGS. 30, 31 with that of FIG. 4 to register the registry mark 70 of FIG. 4 with the fused view of FIGS. 30 and 31. The figures were combined by superimposing the parallax index 300.

FIG. 33 is a plan view of a first side of a stencil sheet 41A with block cut-outs and line apertures corresponding to the R.E.V. stereogram in FIG. 30. Block cut-out 1359A and 1354A correspond to the upper triangle 1359, and the base triangle 1354. Line apertures 1357A and 1358A correspond to supports 1357 and 1358. The registry guide 72 corresponds to the registry mark 70 transferred from the coordinated fused design in FIG. 32. It is an advantage to have the registry guide 72 and registry mark 70 bilaterally symmetrical with regard to the sagital plane of symmetry. This is not a requirement for registers that are not reversible.

In FIG. 33, the upper left corner 43 of stencil sheet 41A is notched to show how the corner is moved as the stencil sheet 41 is turned over. The stencil design of FIG. 33 is transferred to a copy sheet 42 with an orange pencil and the register guide 72 is transferred to form the registry mark 70. FIG. 34 is the plan view of the reverse side of the stencil sheet 41A of FIG. 33. The corner 43 of FIG. 33 which was on the left is on the right in FIG. 34. The block cut-outs and line apertures are the same as in FIG. 33 except they are reversed. For example, block cut-outs 1359A and 1354A on the side 41A of the stencil sheet of FIG. 33 are the reverse of block cut-outs 2359B and 2354B of side 41B of the stencil sheet of FIG. 34. Line apertures 1357A and 1358A of FIG. 33 on the side 41A of the stencil sheet are the reverse of line apertures 2357B and 2358B on side 41B of stencil sheet in FIG. 34. The side of the stencil sheet 41B is transferred with a green-blue pencil to the copy sheet 42. The registry guide 72 can be used to align the reverse side 41B or, in this case, block cut-out 2354B can be superimposed over the stencil design 1354 previously transferred. FIG. 35 is a plan view of the anaglyph formed by transferring the reversible stencil designs of FIGS. 33 and 34 to the copy sheet 42. The solid line is orange and the dotted line is green-blue. By viewing this with 3-D glasses, the image seen by the viewer 86 in FIG. 29 would appear.

FIG. 36 is a plan view of the anaglyphic drawing of FIG. 35 plus the anaglyph of FIG. 9. This is made by aligning the registry guide 72 of the stencil sheet 40 of FIG. 6 to the registry mark 70 on the copy sheet 42 of FIG. 35 and transferring the stencil design from FIG. 6 to the anaglyphic drawing of FIG. 35. Or it could be made by transferring the stencil design from FIGS. 33 and 34 to the anaglyphic drawing of FIG. 9.

FIG. 38 shows a projective view of the 3-dimensional object seen by viewing the anaglyphic drawing of FIG. 36 with 3-D glasses. The stencil sheet 40 of FIG. 25 could also have been added to, or substituted for the stencil sheet of FIG. 6 to make a different 3-dimensional design (not shown). This is an advantage because a child can learn to appreciate different forms of symmetry as he/she creates different anaglyphic drawing by combining the stencil sheets of his/her choice.

A component stencil design can also be the shape of the perimeter of the stencil sheet as this next version of the invention shows. FIG. 37 is a plan view of a stencil sheet 44, the outer perimeter of which forms a component stencil design of the R.E.V. of the stereogram in FIG. 30. The point 1360A corresponds to the point 1360 of FIG. 30; sides 1357A and 1358A in FIG. 37 correspond to supports 1357 and 1358 in FIG. 30. The point 1362A at the corner of the line aperture 49 in FIG. 37 corresponds to point 1362 of FIG. 30. The register for this stencil sheet 44 is the indicia on the base of the stencil sheet "line up this corner with the other side" 73, which will superimpose the base triangles 1354 and 2354. The upper triangle 359 of the three dimensional image of FIG. 29 could be completed by connecting points 1364A and 1365A with a straightedge, as shown by the indicia "connect these corners with a straight edge" associated with arrows 65. To complete the anaglyph, the stencil sheet 44 would be turned over horizontally and positioned along the vertex of the base triangle 1362A and the design transferred with a green-blue pencil.

A version of the invention can also be used to create different anaglyphic drawings on the copy sheet by omitting some parts of the design in the stencil sheet and substituting other parts. For example, FIG. 39 is the plan view of a copy sheet 42 having an anaglyphic drawing made from the stencil sheet 40 of FIG. 6. The base triangle with corners of 110-114-112 is transferred with green-blue and then with orange from the superimposed central block cut-out 53 along with the registry mark 70. Next, the stencil sheet 40 is realigned to the register guide 72 associated with the indica "orange" 62 with the registry mark 70. But instead of transferring all of the stencil design, merely one point corresponding to the angle 120 is transferred to the copy sheet 42 in orange. In a similar manner, one point corresponding to the angle 220 is transferred in green-blue. The anaglyphic drawing of FIG. 39 can then be embellished to produce the anaglyphic drawing of FIG. 40 by using an orange pencil and a straightedge to connect point 110 to point 120, forming line 156A, and connecting point 112 to point 120 forming line 157A; likewise using a green-blue pencil to connect the point 210 to point 220 forming line 156B, and connecting point 212 to point 220 forming line 157B.

FIG. 41 shows a projective view of the anaglyphic drawing of FIG. 40 when viewed with 3-D glasses. The points 120 and 220 are corresponding element points. In this example, they were found by transferring them from the stencil sheet. Connecting the points is best done with a straightedge because the rest of the transferred anaglyph is very accurate and inaccuracies would be especially noticeable to the viewer and could prevent the additional lines from appearing 3-dimensional. This is an advantage because the stencil sheet, having one design, can be used to make many variations on this design. This technique can also be combined with other stencil sheets having coordinated registers, thus the number of possible anaglyphic drawings is greatly increased.

As another example of using a stencil sheet 40 to create a different anaglyphic drawing, FIG. 42 is a plan view of the anaglyphic drawing of FIG. 9, plus a dot 150, which is to the side of the anaglyphic drawing. FIG. 43 is a plan view of the anaglyphic drawing of FIG. 42 with the addition of using an orange pencil and straightedge to connect point 120 to point 150 forming line 1151; and connecting point 119 to point 150 forming line 1152. Likewise, using a green-blue pencil and straightedge to connect point 220 to point 150 forming line 2151; and connecting point 219 to point 150 forming line 2152. FIG. 44 is a projective view of the 3-dimensional object seen by the viewer when viewing the anaglyphic drawing of FIG. 43 with 3-D glasses. Point 150 appears to touch the copy sheet 42. The image of the 3-dimensional object of FIG. 1 now has the addition of line 151 connecting the point 20 on the upper triangle and point 150 on the copy sheet 42; and side 152 connecting the point 19 on the upper triangle and the point 150.

The corresponding element point 150 actually consists of two points that are superimposed on each other because they are in the plane of the copy sheet 42. If corresponding element points above or below the copy sheet are desired, they can be obtained as for FIG. 39 where the single points 120 and 220 were transferred from the stencil sheet 40. Corresponding element points can also be obtained from the anaglyph, for example, by choosing a point on the structure of the orange drawing, and then moving horizontally until the same structure of the green-blue drawing is reached. The pair of corresponding element points can be connected to other points similarly obtained. Corresponding element points can also be obtained by randomly choosing two points horizontally displaced of each other and making one orange and the other green-blue. This is an advantage because endless possibilities exist for the user to combine stencil designs or parts thereof and to add extra structures by finding corresponding element points. Other stencils having coordinated registers can also be combined with this and the previous technique to dramatically increase the possible number of anaglyphic drawings a child can create.

A further method of embellishing the anaglyphs is known in the art and may be easily done freehand. The orange elements can be colored in or texturized, for example, by adding cross-hatching or stippling or designs like flowers or stars if it is done in orange or red and is confined to an enclosed orange element of the anaglyph, such as the triangle 117-119-120 of FIG. 9. This may be best done before the green-blue part of the anaglyph is completed so that the drawing is simpler. If both colors are completed, the viewer can look through the blue lens alone of the 3-D glasses and draw with the orange pencil. Experimenting with using different colors can also be done.

FIG. 45 is the plan view of a stencil sheet 45 on a copy sheet 42. The stencil designs within the stencil sheet 45 are designed to demonstrate finding corresponding element points. The stencil designs consist of block cut-outs of three inverted triangles above three truncated triangles. From left to right, these three upper triangles have left and right sides: 510A, 510B; 514A, 514B; and 518A, 518B. Sides 510A, 514A and 518A all have color indica, shown by cross hatching, of the color orange, 67. Sides 510B, 514B and 518B have color indica shown by horizontal hatching, of the color blue, 69. The color indica shows what color drawing instrument should be used to transfer the stencil design to the copy sheet 42. The portions of the triangles without indica are not to be transferred. The bottom truncated triangles likewise have sides: 512B, 512A; 516B, 516A; and 520B, 520A. Blue color indica 69 is on sides 512B, 516B and 520B. Orange color indica 67 is on sides 512A, 516A, and 520A. The portions of the truncated triangles without color are not transferred to the copy sheet 42. The sides with color indica also have dots at regular intervals. For example, dots 522A and 522B on sides 510A and 510B respectively, dots 546A and 546B on sides 514A and 514B respectively and dots 524B and 524A on sides 520B and 520A respectively. These pairs of dots are corresponding element points on the stencil designs. In this example the register is the stencil shapes and associated indica. An anaglyphic drawing can be completed in this case without moving the stencil sheet on the copy sheet.

FIG. 46 is a plan view of the anaglyphic drawing transferred from FIG. 45 to the copy sheet 42. The sides: 510A, 512A 514A 516A 518A and 520A are all transferred with orange pencil. The dots 522A, 546A and 524A are transferred by making the line slightly larger at that point. Likewise, sides: 510B, 512B, 514B, 516B, 518B and 520B are all transferred with a green-blue pencil. The lines at points 522B, 546B and 524B are slightly larger at those points.

FIG. 47 is a projective view of the anaglyphic drawing of FIG. 46 as seen through 3-D glasses. It shows three broken line segments in a row penetrating the copy sheet 42 perpendicularly with upper segment 510, 514 and 518 and lower segments 512, 516 and 520. The three pairs of corresponding element points are seen as single points on these line segments as points 522, 546, and 524. FIG. 48 is a plan view of the anaglyphic drawing of FIG. 46 with the addition of an orange line 530A connecting points 522A and 524A and a green-blue line 530B connecting points 522B and 524B with the aid of a straightedge. These two lines intersect at the point 532. FIG. 49 is a projective view of the anaglyphic drawing in FIG. 48 as seen with 3-D glasses. The line 530 starts at point 522 on line segment 510 and proceeds at an acute angle to point 524 on line segment 520 beneath the plane of the copy sheet 42. The line 530 intersects the copy sheet at point 532. The corresponding element points are very easy to see in this example and can be used as a first example for the child to understand how this can be transferred to other more complex designs. Corresponding element points can be included on other stencil designs as well.

FIG. 50 is a plan view of the anaglyphic drawing of FIG. 48 with the addition of a generic stencil sheet 540. The generic stencil sheet 540 has four block cut-outs consisting of a crescent, a triangle, a circle and a rectangle 542. The generic stencil sheet 540 is placed on the anaglyphic drawing so that point 546A on line 514A is superimposed by point 544 on the periphery of the rectangular block cut-out 542. In this position the block cut-out 542 is transferred to the copy sheet 42 with an orange pencil. The stencil sheet 540 is then moved horizontally in a translational motion, without rotation, in the direction of point 546B on line segment 514B. When point 544 on the generic stencil sheet 540 is superimposed with point 546B on line segment 514B, the generic stencil sheet 540 is held in place and block cut-out 542 is transferred to the copy sheet 42 with a green-blue pencil.

FIG. 51 is a plan view of the anaglyphic drawing of FIG. 48 with the addition of two rectangles 542A and 542B. FIG. 52 is a projective view of the anaglyph of FIG. 51 as seen with 3-D glasses. The rectangle 542 appears to float in space above and parallel to the plane of the copy sheet 42 and to touch the point 546 on line segment 514. The generic stencil sheet 540 can be any used in the graphic arts as it is the stencil sheet of this version of the invention in FIG. 45 that makes the stencil shape 542 appear 3-dimensional and not the stencil sheet 540 alone. Many generic stencil sheets exist that the child may already have with designs such as letters of the alphabet, animals, icons, cartoon characters as well as geometric shapes. The process of positioning the stencil shape on the anaglyph, tracing it in the appropriate color and moving the stencil shape with a translatory, non-rotating motion to the corresponding element point and tracing the shape again in the appropriate color may require practice for some children. The advantage is that by using some or all of the versions of the invention, very complex and unique anaglyphic drawings can be created by a child in an economical fashion. It is surprising that in a short time, a child can thus create and control complex anaglyphic drawings. The child can even do this while having almost no understanding of the principles involved.

The stencil sheet, drawing instruments, copy sheet, 3-D glasses and a tutorial necessary for making these anaglyphic drawings can also be contained in a kit. If several of the stencil designs share one viewing angle and others a different viewing angle, the registers can be different for each set so the user would know which sets could be combined and appear 3-dimensional without distortion. The contents of the above kit can also be combined as a book.

FIG. 53 is a projective view of an open stencil book. The stencil book is bound with plastic comb-binding 602 which allows the book to lie flat. Other bindings such as spiral bindings, wire-o, or the like can be used. In large quantities they are economical. A binder such as a ring-binder or one with clasps that allow pages to be removed and replaced has the advantage that more than one child can use the stencil sheets at one time, and they can be replaced in the binder to store them for future use. The verso of the stencil book in FIG. 53 contains the stencil designs of FIG. 6 with the combination of block cut-outs 51, 53, and 56 and line apertures 58 and 60. The registry guide 75 is similar to that in FIG. 14 with apertures to accept the registry pins 76. In this case the registry pins are connected to a thin version of the registry platform 77. This thin registry platform 77 has a copy sheet 42 impaled on the registry pins 76 and due to its limited thickness, can fit between the previous page in the book and the stencil sheet 40. The registry platform 77 must be hard enough so if the previous page has block cut-outs or other apertures, the copy sheet 42 will still be supported. The recto of the book has the reversible stencil design of FIG. 33. To better fit the page, the design is on its' side. The registry guides 75 allow the user to make the adjustment of rotating the registry platform 77, 90 degrees clock-wise relative to the design on the verso side. The registry platform 77 with registry pins 76 and the copy sheet 42 is shown with this stencil design of FIG. 33. In this position the design would be transferred to the copy sheet with an orange pencil. The recto would be turned over and the other side 41B (which would then be the verso) and the registry platform 77 reengaged with the reversed registry guides 76. The reversed design would be transferred to the copy sheet with the green-blue pencil. Other designs could be transferred and/or embellished as previously described.

The stencil book of FIG. 53 also includes one version of a receptacle 600 to hold pencils 44A and 44B, 3-D glasses 80 and the like. The receptacle is made of durable, transparent plastic so the contents can be seen without opening it, and may be sealed with a closer such as a zipper, button, latch, snap or hook and loop system or the like. This version of the receptacle is connected to the book by a lanyard 604 that perforates the receptacle 600 and an aperture near the corner of one of the covers of the book. The receptacle may also be used for storing a straightedge, French-curves, stencils, registry platform erasers, or other miscellaneous materials. It is an advantage to have the receptacle separated from the stencil sheet so that transferring the stencil designs to the copy sheet does not have to occur on top of the receptacle thus making the registry platform more unstable. The lanyard has the advantage of keeping these materials in the proximity of the stencil sheets to prevent their misplacement. With different versions, the receptacle could also be a pocket or packet on the book cover or within the book itself. A further advantage is that by joining the receptacle to the stencil book it is easier to sell this kit from a bookstore.

FIG. 54 is a sectional view through the stencil book of FIG. 53 through the phantom line 54—54 looking in the direction of the arrows. The registry platform 77 is between the stencil sheets of the verso and the recto. The registry pins 76 are engaged in the center pair of registry guides 75. The registry platform 77 successively supports the section of the stencil sheet 40 being transferred. The phantom pencil 44 is shown transferring block cut-out 53 to the copy sheet 42. The other stencil apertures under the registry platform do not affect the stencil design being transferred because of the rigidity of the registry platform 77 material. The registry platform 77 is between a stencil sheet 40 and other pages 606 on the recto. These other pages can consist of tutorials, more stencil sheets, a history of stereography, theories of stereopsis, examples of drawings using the stencil sheets 40 and copy sheets 42 that may be removed. The stencil sheets 40 and pages may be arranged in any order such as examples and tutorials in front of the book, stencil sheets 40 in the center and copy sheets 42 in the back. Instead of a large platform to support the copy sheet 42 and stencil sheet 40 as in FIG. 53, a separate planar surface such as a piece of cardboard or composition board can be placed under the stencil sheet of choice and the combined small registry platform 77 with copy sheet 42 of FIG. 20 can be placed on the support. The support, if large enough, can remain in place and the registry platform plus copy sheet can be moved upon it to align them with the register guides 75 of the stencil sheet 40. The support can also be a table top especially if the stencil book can be opened flat so that one individual stencil sheet can be laid on the table to be traced and the remaining pages can be left together such as a spiral binding or wire-o binding or the like. The other versions of registers can also be used with the stencil sheets bound in a book. The tutorial should contain the steps of: 1) positioning the stencil sheet on the copy sheet; 2) registering the copy sheet with the stencil sheet; 3) successively transferring the component stencil designs of the L.E.V. to the copy sheet with a green-blue-drawing instrument; 4) successively transferring the component stencil designs of the R.E.V. to the copy sheet with an orange-drawing instrument.

Although the present invention has been described in considerable detail with reference to certain preferred versions thereof, other versions are possible. For example the subjects for anaglyphs are not limited to simple geometric shapes but may include any three dimensional shape, real or imagined, for example, cartoon characters, icons, animals, alphabets and the like. The stereograms are not limited to projective types but can include shifted elements as are used in 3-D comics and the like. There is no limit in the viewing angle, and the stereogram can be designed to be seen in any direction. The use of these stencils is not limited to children but can be used by students and adults to design anaglyphic drawings for scientific, educational or entertainment purposes. The stencil sheets and copy sheets are not limited in size and may be large enough for classrooms or other large displays. Accordingly, the invention is not limited except by the appending claims.

What is claimed is:

1. A device for producing anaglyphic drawings on a copy sheet that will appear three dimensional when viewed through glasses having a first lens for allowing a predominant transmission therethrough of a color in a first color range and a second lens for allowing a predominant transmission therethrough of a color in a second color range, the second color range being separate from the first color range comprising:

(a) a stencil sheet having component stencil designs therein which when taken together comprise:
  (i) a first eye view stencil design of a stereogram; and
  (ii) a second eye view stencil design of the stereogram;
 (b) a register aligning the copy sheet with the component stencil designs and with a fused design, said fused design being the first eye view of the stereogram horizontally shifted relative to the second eye view of the stereogram, so that any elements of the stereogram that would appear to be within the plane of the copy sheet are superimposed, such that the component stencil designs that comprise the first eye view stencil design can be successively transferred in register to the copy sheet with a drawing instrument depositing color in the second color range; and the component stencil designs that comprise the second eye view stencil design can be successively transferred in register with a drawing instrument depositing color in the first color range.

2. The device for producing anaglyphic drawings of claim 1, the stencil sheet additionally comprising:
 (a) indica thereon showing how the stencil sheet is used to make an anaglyphic drawing.

3. The device for producing anaglyphic drawings of claim 1, the register additionally comprising:
 (a) a registry guide within the stencil sheet aligned with each component stencil design and the fused design; and (b) a registry mark on the copy sheet such that the registry mark can be successively aligned with the registry guide and the component stencil designs transferred in register to the copy sheet.

4. The device for producing anaglyphic drawings of claim 1, the register additionally comprising:
 (a) a registry guide within the stencil sheet aligned with each component stencil design and a fused design; and
 (b) a registry platform comprising:
  (i) a support upon which the copy sheet is attached and;
  (ii) at least one registry pin fixed upon the support and adapted to fit non-rotatably into the registry guide such that the copy sheet can be successively aligned with the component stencil designs in the stencil sheet and the component stencil designs transferred to the copy sheet in register.

5. The device for producing anaglyphic drawings of claim 4, the registry platform additionally comprising:
 (a) a rigid planar surface large enough to support the copy sheet and that portion of the stencil sheet to be transferred.

6. The device for producing anaglyphic drawings of claim 1, the register further comprising:
 (a) a coordinated register such that the fused design is aligned with a second fused design of a second stereogram, said second stereogram and said stereogram having substantially the same viewing angle, such that a second stencil sheet having component stencil designs of a second first eye view stencil design can be transferred to the copy sheet with color in the second color range and a second second eye view of the second stereogram can be transferred to the copy sheet in color in the first color range and the three dimensional image of the stereogram and the second stereogram will appear to intersect.

7. The device for producing anaglyphic drawings of claim 1, the stencil sheet further comprising:
 (a) indica showing at least one set of corresponding element points, such that said corresponding element points can be transferred to the copy sheet, said corresponding element points being a pair of points one on the first eye view of the stereogram and one on the second eye view of the stereogram, horizontally shifted of each other that together form the same point on the three dimensional image.

8. The device for producing anaglyphic drawings of claim 1, wherein the first color range is from orange to red and the second color range is from blue to green.

9. A device for producing anaglyphic drawings on a copy sheet that will appear three dimensional when viewed through glasses having a first lens for allowing a predominant transmission therethrough of a color in a first color range and a second lens for allowing a predominant transmission therethrough of a color in a second color range, the second color range being separate from the first color range comprising:
 (a) a reversible stencil sheet comprising:
  (i) a first side having first component stencil designs therein which when taken together comprise:
   (a) a first eye view stencil design of a reversible stereogram; and
  (ii) a second side having second component stencil designs therein, said second component stencil designs coincident with, and the mirror image of the first component stencil designs of the first side which when taken together comprise:

(a) a second eye view stencil design of the reversible stereogram; and (b) a register aligning the copy sheet with the component stencil designs and a fused design, said fused design being the first eye view of the reversible stereogram horizontally shifted relative to the second eye view of the reversible stereogram so that any elements of the reversible stereogram that would appear within the plane of the copy sheet are superimposed, such that the component stencil designs that comprise the first eye view stencil design can be successively transferred in register to the copy sheet with a drawing instrument depositing color in the second color range; and the component stencil designs that comprise the second eye view stencil design can be successively transferred in register with a drawing instrument depositing color in the first color range.

10. The device for producing anaglyphic drawings of claim 9, the reversible stencil sheet additionally comprising:

(a) the first side having a perimeter conforming to at least one portion of the first component stencil design; and (b) the second side having said perimeter conforming to at least one portion of the second component stencil design.

11. The device for producing anaglyphic drawings of claim 9, the register further comprising:

(a) a coordinated register such that the fused design is aligned with a second fused design of a second stereogram, said second stereogram and said stereogram having substantially the same viewing angle, such that a second stencil sheet having component stencil designs of a second first eye view stencil design can be transferred to the copy sheet with color in the second color range and a second second eye view of the second stereogram can be transferred to the copy sheet with color in the first color range and the three dimensional image of the stereogram and the second stereogram will appear to intersect.

12. The device for producing anaglyphic drawings of claim 9, the stencil sheet further comprising:

(a) indica showing at least one set of corresponding element points, such that said corresponding element points can be transferred to the copy sheet, said corresponding element points being a pair of points, one on the first eye view of the reversible stereogram and one on the second eye view of the reversible stereogram, horizontally shifted of each other so that together they form the same point on the three dimensional image.

13. The device for producing anaglyphic drawings of claim 9, wherein the first color range is from orange to red and the second color range is from blue to green.

14. A method of producing an apparatus for making anaglyphic drawings on a copy sheet that will appear three dimensional when viewed through glasses having a first lens for allowing a predominant transmission therethrough of a color in a first color range and second lens for allowing a predominant transmission therethrough of a color in a second color range, the second color range being separate from the first color range comprising the steps of:

(a) making a fused design by combining a first eye view and second eye view of a stereogram by horizontally shifting the first eye view and the second eye view until those elements of the stereogram that would be seen as in the plane of the copy sheet are superimposed;

(b) registering the fused design;

(c) separating the first eye view and register into component stencil designs, each component stencil design retaining the registration;

(d) separating the second eye view into component stencil designs, each component stencil design retaining the registration;

(e) transferring the component stencil designs and their associated registers to a stencil sheet, so that the stencil sheet can be successively placed on the copy sheet, the register associated with the copy sheet and the component stencil designs that make up the first eye view transferred in register to the copy sheet with a drawing instrument depositing color in the second color range, and the component stencil designs that make up the second eye view transferred in register to the copy sheet with a drawing instrument depositing color in the first color range.

15. The method of producing an apparatus for making anaglyphic drawings of claim 14 wherein said step of registering the fused design additionally comprises:

(a) making a coordinated register by:

(i) registering the fused designs of a plurality of different stereograms all having substantially the same viewing angle by substantially superimposing a parallax index; said parallax index being substantially the same distance and angle from a viewer's eyes;

(b) continuing the remaining steps with the coordinated register.

16. A method for producing anaglyphic drawings on a copy sheet that will appear three dimensional when viewed through glasses having a first lens for allowing a predominant transmission therethrough of a color in a first color range and a second lens for allowing a predominant transmission therethrough of a color in a second color range, the second color range being separate from the first color range by using a stencil sheet having component stencil designs therein which when taken together comprise a first eye view stencil design of a stereogram and a second eye view of the stereogram and a register that aligns the component stencil designs of the first eye view stencil design, the component stencil designs of the second eye view stencil design and a fused design that horizontally shifts the first eye view stencil design and the second eye view stencil design so that those elements of the stereogram that would be seen as in the plane of the copy sheet are superimposed, comprising the steps of:

(a) placing the stencil sheet upon the copy sheet;

(b) transferring in succession the component stencil designs that comprise the first eye view stencil design by:

(i) registering a portion of the component stencil designs in the stencil sheet that form the first eye view stencil design with the copy sheet;

(ii) penciling around the first eye view stencil design associated with the register with a drawing instrument depositing color in the second color range;

(iii) repeating steps i and ii until the complete first eye view stencil design is transferred to the copy sheet;

(c) transferring in succession the component stencil designs that comprise the second eye view stencil design by:

(i) registering a portion of the component stencil designs in the stencil sheet that form the second eye view stencil design with the copy sheet;

(ii) penciling around the second eye view stencil design associated with the register with a drawing instrument depositing color in the first color range;

(iii) repeating steps i and ii until the complete second eye view stencil design is transferred to the copy sheet.

17. The method of claim 16 including the additional steps to embellish the anaglyphic drawing comprising:
  (a) locating a first set of corresponding element points on the anaglyph by
    (i) choosing a first point on the first eye view stencil design and
    (ii) moving horizontally toward a first corresponding element point on the second eye view stencil design.
  (b) locating a second set of corresponding element points on the anaglyph by repeating steps i and ii with a second point;
  (c) connecting the first point on the first eye view stencil design to the second point on the first eye view stencil design by drawing a straight line with a drawing instrument depositing a color in the second color range;
  (d) connecting the first corresponding element point on the second eye view stencil design with the second corresponding element point on the second eye view stencil design by drawing a straight line with a drawing instrument depositing a color in the first color range.

18. The method of claim 16 including additional steps for superimposing different anaglyphic designs on each other comprising:
  (a) continuing the process of claim 16 on the copy sheet with a second stencil sheet having a second stereogram stencil design, and a coordinated register by:
    (i) registering the coordinated register with a portion of the component stencil designs in the second stencil sheet that form the second-first eye view stencil design with the copy sheet;
    (ii) penciling around the second-first eye view stencil design associated with the coordinated register with a drawing instrument depositing color in the second color range;
    (iii) repeating steps (i) and (ii) until the complete second-first eye view stencil design is transferred to the copy sheet; and
    (iv) registering the coordinated register with a portion of the component stencil designs in the second stencil sheet that form the second-second eye view stencil design with the copy sheet;
    (v) penciling around the second-second eye view stencil design associated with the coordinated register with a drawing instrument depositing color in the first color range;
    (vi) repeating steps (iv) and (v) until the complete second-second eye view stencil design is transferred to the copy sheet.

19. The method for producing anaglyphic drawings of claim 16, wherein the first color range is from orange to red and the second color range is from blue to green.

20. A kit for producing anaglyphic drawings on a copy sheet, said drawings appearing three dimensional when viewed through glasses having a first lens for allowing a predominant transmission therethrough of a color in a first color range and a second lens for allowing a predominant transmission therethrough of a color in a second color range, the first color range being separate from the second color range comprising:

(a) at least one stencil sheet having component stencil designs therein comprising:
    (i) a first eye view stencil design of a stereogram; and
    (ii) a second eye view stencil design of the stereogram;
  (b) a register aligning the copy sheet with the component stencil designs and with a fused design, so that the component stencil designs that comprise the first eye view stencil design can be successively transferred in register to the copy sheet with a drawing instrument depositing color in the second color range; and the component stencil designs that comprise the second eye view stencil design can be successively transferred in register with a drawing instrument depositing color in the first color range;
  (c) at least one copy sheet;
  (d) a tutorial having the steps:
    (i) placing the stencil sheet upon the copy sheet;
    (ii) transferring in succession the component stencil designs that comprise the first eye view stencil design by;
      (a) registering a portion of those component stencil designs in the stencil sheet that form the first eye view stencil design on the copy sheet;
      (b) penciling around the periphery of the first eye view stencil design aligned with the register with the drawing instrument depositing color in the second color range;
      (c) repeating steps (a) and (b) until the complete first eye view stencil design is transferred to the copy sheet;
    (iii) transferring in succession the component stencil designs that comprise the second eye view stencil design by;
      (a) registering a portion of those component stencil designs in the stencil sheet that form the second eye view stencil design on the copy sheet;
      (b) penciling around the periphery of the second eye view stencil design aligned with the register with the drawing instrument depositing color in the first color range;
      (c) repeating steps (a) and (b) until the complete second eye view stencil design is transferred to the copy sheet.

21. The kit of claim 20 wherein the first color range is from orange to red and the second color range is from blue to green.

22. The kit of claim 20 wherein the stencil sheet, copy sheet, and tutorial are pages of a book.

23. The kit of claim 20 wherein the register additionally comprises a coordinated register such that a plurality of stereogram stencil designs all having substantially the same viewing angle can be transferred to the copy sheet and superimposed so that the three dimensional images appears to intersect.

24. The kit of claim 23 wherein the stencil sheet, copy sheet, register and coordinated register are pages of a book.

* * * * *